(12) United States Patent
Li et al.

(10) Patent No.: US 11,901,555 B2
(45) Date of Patent: Feb. 13, 2024

(54) BATTERY MODULE, BATTERY PACK, AND ELECTRIC APPARATUS

(71) Applicant: Contemporary Amperex Technology Co., Limited, Ningde (CN)

(72) Inventors: Quanguo Li, Ningde (CN); Yonghuang Ye, Ningde (CN); Chengdu Liang, Ningde (CN); Haizu Jin, Ningde (CN); Qian Liu, Ningde (CN); Fajun Huang, Ningde (CN); Xiaofu Xu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 18/149,672

(22) Filed: Jan. 4, 2023

(65) Prior Publication Data
US 2023/0163296 A1   May 25, 2023

Related U.S. Application Data

(63) Continuation of application No. PCT/CN2021/109686, filed on Jul. 30, 2021.

(51) Int. Cl.
*H01M 4/525* (2010.01)
*H01M 10/615* (2014.01)
(Continued)

(52) U.S. Cl.
CPC ........... *H01M 4/525* (2013.01); *H01M 4/505* (2013.01); *H01M 10/0525* (2013.01);
(Continued)

(58) Field of Classification Search
None
See application file for complete search history.

(56) References Cited

U.S. PATENT DOCUMENTS

| 8,993,140 | B2 | 3/2015 | Schiemann et al. |
| 9,799,873 | B2 | 10/2017 | Kohlberger |

(Continued)

FOREIGN PATENT DOCUMENTS

| CN | 101262049 A | 9/2008 |
| CN | 101409369 A | 4/2009 |

(Continued)

OTHER PUBLICATIONS

The international search report received in the corresponding International Application PCT/CN2021/109686, dated Apr. 25, 2022.
(Continued)

*Primary Examiner* — Robert S Carrico
(74) *Attorney, Agent, or Firm* — Kilpatrick Townsend & Stockton LLP

(57) ABSTRACT

A battery module, a battery pack, and an electric apparatus are provided. In some embodiments, the battery module includes a first type of cell and a second type of cell that are cells of different chemical systems, where the first type of cell includes n first cells, the second type of cell includes m second cells, n and m each are selected from an integer greater than 1, at least one of the first cells and at least one of the second cells are electrically connected in series, and the first cell and the second cell satisfy at least the following relationships: $0.08 \leq \Delta R_B / \Delta R_A \leq 3.50$, and $0.10 \text{ m}\Omega/100 \text{ cycles} \leq \Delta R_A \leq 0.40 \text{ m}\Omega/100 \text{ cycles}$, where $\Delta R_A$ is a discharge resistance growth rate of the first cell, and $\Delta R_B$ is a discharge resistance growth rate of the second cell; and $IMP_B < IMP_A$, where $IMP_A$ is an alternating current impedance of the first cell, and $IMP_B$ is an alternating current impedance of the second cell.

16 Claims, 5 Drawing Sheets

(51) Int. Cl.
- *H01M 4/505* (2010.01)
- *H01M 10/0525* (2010.01)
- *H01M 10/654* (2014.01)
- *H01M 50/204* (2021.01)
- *H01M 50/233* (2021.01)
- *H01M 50/267* (2021.01)
- *H01M 10/617* (2014.01)

(52) U.S. Cl.
CPC ....... *H01M 10/615* (2015.04); *H01M 10/617* (2015.04); *H01M 10/654* (2015.04); *H01M 50/204* (2021.01); *H01M 50/233* (2021.01); *H01M 50/267* (2021.01)

(56) References Cited

U.S. PATENT DOCUMENTS

| | | |
|---|---|---|
| 10,128,528 B2 | 11/2018 | Zhang et al. |
| 10,177,423 B2 | 1/2019 | Heeg et al. |
| 10,587,001 B2 | 3/2020 | Park |
| 10,907,981 B2 | 2/2021 | Li et al. |
| 2003/0068557 A1 | 4/2003 | Kumashiro et al. |
| 2006/0197496 A1 | 9/2006 | Iijima et al. |
| 2007/0072059 A1* | 3/2007 | Kitao ............... H01M 10/441 429/223 |
| 2008/0241666 A1* | 10/2008 | Baba ............... H01M 4/505 429/231.95 |
| 2009/0162751 A1 | 6/2009 | Honbo et al. |
| 2010/0136391 A1 | 6/2010 | Prilutsky et al. |
| 2011/0086248 A1* | 4/2011 | Nakura ............... H01M 4/485 429/9 |
| 2012/0126753 A1 | 5/2012 | Carkner |
| 2012/0164490 A1 | 6/2012 | Itoi et al. |
| 2013/0337310 A1 | 12/2013 | Omura et al. |
| 2014/0020235 A1 | 1/2014 | Aramaki et al. |
| 2014/0087227 A1 | 3/2014 | Shih et al. |
| 2014/0181551 A1 | 6/2014 | Rahal-Arabi et al. |
| 2014/0186659 A1 | 7/2014 | Dhar et al. |
| 2015/0132625 A1 | 5/2015 | Miyata et al. |
| 2015/0188188 A1 | 7/2015 | Zhang et al. |
| 2015/0188207 A1 | 7/2015 | Son et al. |
| 2015/0280276 A1 | 10/2015 | Lemke et al. |
| 2015/0357687 A1 | 12/2015 | Heeg et al. |
| 2015/0357688 A1 | 12/2015 | Heeg et al. |
| 2016/0099451 A1 | 4/2016 | Murai et al. |
| 2016/0126546 A1 | 5/2016 | Takami et al. |
| 2016/0200214 A1 | 7/2016 | Ishibashi et al. |
| 2016/0301045 A1 | 10/2016 | Tyler et al. |
| 2016/0380315 A1 | 12/2016 | Weicker et al. |
| 2017/0179535 A1 | 6/2017 | Murashi et al. |
| 2017/0365886 A1* | 12/2017 | Hoshina ............ H01M 10/0525 |
| 2018/0034023 A1 | 2/2018 | Newman et al. |
| 2018/0138478 A1 | 5/2018 | Chan |
| 2018/0145383 A1 | 5/2018 | Krishnan et al. |
| 2018/0159101 A1 | 6/2018 | Tsang et al. |
| 2018/0212458 A1 | 7/2018 | Kawai et al. |
| 2019/0067658 A1 | 2/2019 | Fujiwara et al. |
| 2019/0074560 A1 | 3/2019 | Reimer et al. |
| 2019/0103625 A1 | 4/2019 | Haraguchi et al. |
| 2019/0157636 A1 | 5/2019 | Miler et al. |
| 2019/0225093 A1 | 7/2019 | Li et al. |
| 2019/0226859 A1 | 7/2019 | Li et al. |
| 2019/0267686 A1 | 8/2019 | Shimizu et al. |
| 2019/0334143 A1 | 10/2019 | Sugeno |
| 2020/0014000 A1 | 1/2020 | Roddy et al. |
| 2020/0058968 A1 | 2/2020 | Thompson et al. |
| 2020/0106126 A1 | 4/2020 | Yokoshima et al. |
| 2020/0130511 A1 | 4/2020 | Botts et al. |
| 2020/0313255 A1 | 10/2020 | Wu et al. |
| 2021/0025723 A1 | 1/2021 | Li et al. |
| 2021/0050635 A1 | 2/2021 | Lee et al. |
| 2021/0074979 A1 | 3/2021 | Kwak et al. |
| 2021/0296721 A1 | 9/2021 | Omura et al. |
| 2021/0328281 A1 | 10/2021 | Chu et al. |
| 2022/0123427 A1 | 4/2022 | Ren et al. |

FOREIGN PATENT DOCUMENTS

| | | |
|---|---|---|
| CN | 101504977 A | 8/2009 |
| CN | 101635372 A | 1/2010 |
| CN | 101675555 A | 3/2010 |
| CN | 201749897 U | 2/2011 |
| CN | 102027617 A | 4/2011 |
| CN | 102447301 A | 5/2012 |
| CN | 202308227 U | 7/2012 |
| CN | 101242011 B | 9/2012 |
| CN | 103311562 A | 9/2013 |
| CN | 104126238 A | 10/2014 |
| CN | 105006586 A | 10/2015 |
| CN | 105186066 A | 12/2015 |
| CN | 105849968 A | 8/2016 |
| CN | 105914804 A | 8/2016 |
| CN | 106207016 A | 12/2016 |
| CN | 206225503 U | 6/2017 |
| CN | 107004920 A | 8/2017 |
| CN | 107112603 A | 8/2017 |
| CN | 107256971 A | 10/2017 |
| CN | 206567773 U | 10/2017 |
| CN | 108598598 A | 9/2018 |
| CN | 208507849 U | 2/2019 |
| CN | 109428114 A | 3/2019 |
| CN | 208674305 U | 3/2019 |
| CN | 109659465 A | 4/2019 |
| CN | 110048151 A | 7/2019 |
| CN | 110065414 A | 7/2019 |
| CN | 110071236 A | 7/2019 |
| CN | 209071461 U | 7/2019 |
| CN | 110265591 A | 9/2019 |
| CN | 110265627 A | 9/2019 |
| CN | 110380144 A | 10/2019 |
| CN | 110444835 A | 11/2019 |
| CN | 110456275 A | 11/2019 |
| CN | 110678393 A | 1/2020 |
| CN | 210040332 U | 2/2020 |
| CN | 210403875 U | 4/2020 |
| CN | 111106277 A | 5/2020 |
| CN | 111106278 A | 5/2020 |
| CN | 111446488 A | 7/2020 |
| CN | 111584792 A | 8/2020 |
| CN | 211295236 U | 8/2020 |
| CN | 111668409 A | 9/2020 |
| CN | 211629259 U | 10/2020 |
| CN | 111900294 A | 11/2020 |
| DE | 102012215495 A1 | 3/2014 |
| DE | 202017104111 U1 | 10/2018 |
| DE | 102017212223 A1 | 1/2019 |
| EP | 1265302 A2 | 12/2002 |
| EP | 3193402 A1 | 7/2017 |
| EP | 3261161 A1 | 12/2017 |
| EP | 3316391 A1 | 5/2018 |
| EP | 3358706 A1 | 8/2018 |
| EP | 3675218 A1 | 7/2020 |
| EP | 3926724 A2 | 12/2021 |
| JP | H07320775 | 12/1995 |
| JP | 2003174734 A | 6/2003 |
| JP | 2004342580 A | 12/2004 |
| JP | 2005071917 A | 3/2005 |
| JP | 2007059145 A | 3/2007 |
| JP | 2008226518 A | 9/2008 |
| JP | 2009021223 A | 1/2009 |
| JP | 2010250984 A | 11/2010 |
| JP | 2011065906 A | 3/2011 |
| JP | 2012113899 A | 6/2012 |
| JP | 2012234696 A | 11/2012 |
| JP | 2013509688 A | 3/2013 |
| JP | 2014072025 A | 4/2014 |
| JP | 2014112463 A | 6/2014 |
| JP | 2015018706 A | 1/2015 |
| JP | 2015133169 A | 7/2015 |
| JP | 2015170591 A | 9/2015 |
| JP | 2015530858 A | 10/2015 |
| JP | 2015204247 A | 11/2015 |
| JP | 2015211025 A | 11/2015 |
| JP | 2017139844 A | 8/2017 |
| JP | 2019129149 A | 8/2019 |

(56) References Cited

FOREIGN PATENT DOCUMENTS

| | | |
|---|---|---|
| JP | 2019139879 A | 8/2019 |
| JP | 2020035692 A | 3/2020 |
| JP | 2023509197 A | 3/2023 |
| JP | 2023509198 A | 3/2023 |
| NO | 2013031613 A1 | 3/2013 |
| WO | 2004095611 A1 | 11/2004 |
| WO | 2011114349 A2 | 9/2011 |
| WO | 2012014418 A1 | 2/2012 |
| WO | 2012060031 A1 | 5/2012 |
| WO | 2013069308 A1 | 5/2013 |
| WO | 2013099293 A1 | 7/2013 |
| WO | 2014045569 A1 | 3/2014 |
| WO | 2017191679 A1 | 11/2017 |
| WO | 2019123903 A1 | 6/2019 |
| WO | 2019161751 A1 | 8/2019 |
| WO | 2019187313 A1 | 10/2019 |
| WO | 2020133659 A1 | 7/2020 |
| WO | 2020134054 A1 | 7/2020 |
| WO | 2022067808 A1 | 4/2022 |
| WO | 2022067809 A1 | 4/2022 |
| WO | 2022067810 A1 | 4/2022 |

OTHER PUBLICATIONS

The written opinion received in the corresponding International Application PCT/CN2021/109686, dated Apr. 25, 2022.
Particle size analysis—Laser diffraction methods (ISO 13320:2009), GB/T 19077-2016, published Feb. 24, 2016.
General rules for analytical scanning electron microscopy, JY/T 010-1996, published Jan. 23, 1997, p. 196-200.
The extended European search report received in the corresponding European Application 20947010.3, dated Jan. 25, 2023.
The international search report received in the corresponding International Application PCT/CN2020/105474, dated Apr. 26, 2021.
The International search report for PCT Application No. PCT/CN2021/089665, dated Jul. 30, 2021, 17 pages.
The International search report for PCT Application No. PCT/CN2021/089319, dated Jul. 26, 2021, 14 pages.
The First Office Action for Chinese Application No. 202010786641.X, dated Oct. 26, 2022, 16 pages.
The First Office Action for Chinese Application No. 202010786523.9, dated Oct. 24, 2022, 17 pages.
The extended European search report for EP Application No. 21789597.8, dated Nov. 16, 2022, 11 pages.
The partial supplementary extended European search report for EP Application No. 21789597.8, dated Aug. 12, 2022, 13 pages.
The extended European search report for EP Application No. 21790065.3, dated Nov. 18, 2022, 11 pages.
The partial supplementary extended European search report for EP Application No. 21790065.3, dated Aug. 18, 2022, 13 pages.
The First Office Action for Indian Application No. 202217009095, dated Dec. 16, 2022, 6 pages.
The Second Office Action for Chinese Application No. 202010786523.9, dated Feb. 28, 2023, 10 pages.
The International search report for PCT Application No. PCT/CN2020/139180, dated Sep. 29, 2021, 4 pages.
The Written Opinion for PCT Application No. PCT/CN2020/139180, dated Sep. 29, 2021, 4 pages.
The extended European search report for EP Application No. 20947817.1, dated Nov. 30, 2022, 7 pages.
The International search report for PCT Application No. PCT/CN2020/119738, dated Jun. 25, 2021, 5 pages.
The Written Opinion for PCT Application No. PCT/CN2020/119738, dated Jun. 25, 2021, 4 pages.
The International search report for PCT Application No. PCT/CN2020/129475, dated Aug. 16, 2021, 4 pages.
The Written Opinion for PCT Application No. PCT/CN2020/119737, dated Aug. 16, 2021, 3 pages.
The International search report for PCT Application No. PCT/CN2020/119737, dated Jul. 2, 2021, 3 pages.
The Written Opinion for PCT Application No. PCT/CN2020/119737, dated Jul. 2, 2021, 5 pages.
The International search report for PCT Application No. PCT/CN2020/119736, dated Apr. 28, 2021, 5 pages.
The Written Opinion for PCT Application No. PCT/CN2020/119736, dated Apr. 28, 2021, 4 pages.
The corresponding U.S. Appl. No. 17/970,603 as filed.
The corresponding U.S. Appl. No. 18/054,375 as filed.
International Search Report of corresponding international application PCT/CN2021/109686, dated Apr. 25, 2022.
Written Opinion of corresponding international application PCT/CN2021/109686, dated Apr. 25, 2022.
The extended European search report for EP Application No. 20955830.3, dated Mar. 30, 2023, 8 pages.
The extended European search report received in the corresponding European Application 21937198.6, dated Aug. 14, 2023.
First office action received in the corresponding Chinese Application 202080054687.0, dated Jul. 24, 2023.
Notification of Grant of Invention Patent Rights received in the corresponding Chinese Application 202080054687.0, dated Sep. 28, 2023.
Communication about intention to grant a European patent received in the corresponding European Application 20947010.3, dated Aug. 4, 2023.
Examination Report received in the corresponding Indian Application 202227016170, dated Mar. 21, 2023.
Non-Final Office Action received in the corresponding U.S. Appl. No. 17/970,603, dated Jul. 19, 2023.
Written Opinion received in the corresponding International Application PCT/CN2020/105474, dated Apr. 26, 2021.
Second office action received in the corresponding Chinese Application 202010786641.X, dated Apr. 19, 2023.
Third office action received in the corresponding Chinese Application 202010786641.X, dated Jun. 7, 2023.
Notice of rejection received in the corresponding Chinese Application 202010786641.X, dated Jun. 29, 2023.
Communication about intention to grant a European patent received in the corresponding European Application 21789597.8, dated May 24, 2023.
Written Opinion received in the corresponding International Application PCT/2021/089665, dated Jul. 30, 2021.
First office action received in the corresponding Chinese Application 202080054659.9, dated Jun. 24, 2023.
Non-Final Office Action received in the corresponding U.S. Appl. No. 17/892,621, dated Feb. 3, 2023.
Notice of Allowance received in the corresponding U.S. Appl. No. 17/892,621, dated May 24, 2023.
Notice of rejection received in the corresponding Chinese Application 202010786523.9, dated May 27, 2023.
Communication about intention to grant a European patent received in the corresponding European Application 21790065.3, dated May 25, 2023.
Restriction Requirement received in the corresponding U.S. Appl. No. 17/556,991, dated Oct. 11, 2023.
Written Opinion received in the corresponding International Application PCT/CN2021/089319, dated Jul. 26, 2021.
Notice of Reasons for Refusal received in the corresponding Japanese Application 2022-542009, dated Sep. 4, 2023.
Non-Final Office Action received in the corresponding U.S. Appl. No. 18/054,375, dated Aug. 24, 2023.
Restriction Requirement received in the corresponding U.S. Appl. No. 18/054,375, dated Jul. 7, 2023.
Extended European Search Report received in the corresponding European Application 20961838.8, dated Aug. 17, 2023.
Non-Final Office Action received in the corresponding U.S. Appl. No. 17/985,851, dated Mar. 22, 2023.
Notice of Allowance received in the corresponding U.S. Appl. No. 17/985,851, dated Jul. 19, 2023.
Written Opinion received in the corresponding International Application PCT/CN2020/129475, dated Aug. 16, 2021.
Notice of Reasons for Refusal received in the corresponding Japanese Application 2022-539699, dated Jul. 31, 2023.

(56) References Cited

OTHER PUBLICATIONS

Non-Final Office Action received in the corresponding U.S. Appl. No. 17/985,813, dated Mar. 8, 2023.
Final Office Action received in the corresponding U.S. Appl. No. 17/985,813, dated Aug. 9, 2023.
Non-Final Office Action received in the corresponding U.S. Appl. No. 17/985,813, dated Jun. 14, 2023.
Notice of Allowance received in the corresponding U.S. Appl. No. 17/985,813, dated Oct. 18, 2023.
Extended European Search Report received in the corresponding European Application 20955828.7, dated Sep. 27, 2023.
Notice of Reasons for Refusal received in the corresponding Japanese Application 2022-542013, dated Oct. 2, 2023.
Non-Final Office Action received in the corresponding U.S. Appl. No. 18/053,493, dated Mar. 9, 2023.
Final Office Action received in the corresponding U.S. Appl. No. 18/053,493, dated Jul. 17, 2023.
Advisory Action received in the corresponding U.S. Appl. No. 18/053,493, dated Sep. 21, 2023.

\* cited by examiner

BATTERY MODULE, BATTERY PACK, AND ELECTRIC APPARATUS

CROSS-REFERENCE TO RELATED APPLICATIONS

This application is a continuation of International Application No. PCT/CN2021/109686, filed on Jul. 30, 2021, which is hereby incorporated by reference in its entirety.

TECHNICAL FIELD

This disclosure relates to the field of lithium battery technologies, and in particular, to a battery module, a battery pack, and an electric apparatus.

BACKGROUND

New energy electric vehicles grow increasingly in their market share due to vigorous promotion by the Chinese government. While enjoying welfare brought by clean and environmentally friendly energy, people also pay attention to and keep alleviating some deficiencies exposed in the development process of the new energy electric vehicles. At present, energy storage batteries used in most of the new energy electric vehicles are mainly lithium-ion secondary batteries that are mainly made of lithium iron phosphate, lithium manganate, lithium cobaltate, and other ternary compositions containing nickel, cobalt, and manganese.

At a current stage, in order to increase total energy released by a secondary battery, usually a plurality of battery cells of a same chemical system are electrically connected in series or parallel to form a battery module or battery pack of a high capacity to output electrical energy. However, in low-temperature environments in high latitude or high altitude, large-capacity battery modules or battery packs are prone to reduced usable capacity and poor power performance that seriously affect performance of battery modules or battery packs in complex working conditions.

Therefore, how to deal with rapid capacity degradation of the large-capacity battery modules or battery packs in low-temperature environments while ensuring power performance of the lithium-ion secondary batteries has become a technical problem that needs to be resolved urgently.

SUMMARY

An objective is to provide a battery module, so as to further solve the problems of rapid capacity degradation and poor power performance of large-capacity battery modules or battery packs at low temperature.

To achieve the foregoing objective, this application provides a battery module, a battery pack, and an electric apparatus.

A first aspect of this disclosure provides a battery module, including a first type of cell and a second type of cell that are cells of different chemical systems, where the first type of cell includes n first cells, the second type of cell includes m second cells, n and m each are selected from an integer greater than 1, at least one of the first cells and at least one of the second cells are electrically connected in series, and the first cell and the second cell satisfy at least conditions (1) to (3):

$$0.08 \leq \Delta R_B / \Delta R_A \leq 3.50; \quad \text{condition (1):}$$

$$0.10 \text{ m}\Omega/100 \text{ cycles} \leq \Delta R_A \leq 0.40 \text{ m}\Omega/100 \text{ cycles; and} \quad \text{condition (2):}$$

$$IMP_B < IMP_A; \quad \text{condition (3):}$$

where $\Delta R_A$ is a discharge resistance growth rate of the first cell, $\Delta R_B$ is a discharge resistance growth rate of the second cell, $IMP_A$ is an alternating current impedance of the first cell, and $IMP_B$ is an alternating current impedance of the second cell.

In this application, the first type of cell and the second type of cell are disposed and connected in series in the battery module, where the two types of cells meet the foregoing characteristics and have different features in alternating current impedance and discharge resistance growth rate. During charging and discharging of the two types of cells, the alternating current impedance of the first type of cell is greater than that of the second type of cell, so that the first type of cell releases more heat than the second type of cell does. The first type of cell transfers heat to the second type of cell, adjusting an actual temperature of the second type of cell to be in an ideal temperature range for power and capacity performance, thereby increasing a capacity retention rate and power performance of the entire battery module or battery pack at low temperature.

In some embodiments, at least part of the first cell and at least part of the second cell are in thermal contact. In this way, the thermal contact between the at least part of the first cell and the at least part of the second cell can ensure good heat transfer efficiency between the first cell and the second cell.

In some embodiments, the discharge resistance growth rate $\Delta R_B$ of the second cell further satisfies the following condition: 0.03 m$\Omega$/100 cycles $\leq \Delta R_B \leq$ 0.35 m$\Omega$/100 cycles, and optionally, 0.05 m$\Omega$/100 cycles $\leq \Delta R_B \leq$ 0.32 m$\Omega$/100 cycles. In this way, the discharge resistance growth rate $\Delta R_B$ of the second cell is limited, and with 0.10 m$\Omega$/100 cycles $\leq \Delta R_A \leq$ 0.40 m$\Omega$/100 cycles, it is ensured that even at an end phase of cycle life of the battery module during charging and discharging, the first type of cell still releases more heat than the second type of cell does, so that the first cell adjusts temperature of the second cell in a low-temperature environment, thereby improving power performance of the battery module throughout the life cycle.

In some embodiments, the alternating current impedance $IMP_A$ of the first cell further satisfies the following condition: 0.08 m$\Omega \leq IMP_A \leq$ 2 m$\Omega$, and optionally, 0.1 m$\Omega \leq IMP_A \leq$ 1.2 m$\Omega$. In this way, the alternating current impedance $IMP_A$ of the first cell is limited within an appropriate range, allowing the first cell to release more initial heat than the second cell, thereby increasing power of the second cell.

In some embodiments, the alternating current impedance $IMP_B$ of the second cell further satisfies the following condition: 0.05 m$\Omega \leq IMP_B \leq$ 1.5 m$\Omega$ and optionally, 0.09 m$\Omega \leq IMP_B \leq$ 1 m$\Omega$. In this way, the alternating current impedance $IMP_B$ of the second cell is limited within an appropriate range, allowing the first cell to release more initial heat than the second cell, thereby increasing power of the second cell.

In some embodiments, the first cell and the second cell further satisfy the following relationship: $1 \leq Cap_A/Cap_B \leq 1.9$, and optionally, $1.1 \leq Cap_A/Cap_B \leq 1.6$, where $Cap_A$ is a capacity of the first cell, and $Cap_B$ is a capacity of the second cell. In this way, a proportional relationship between $Cap_A$ and $Cap_B$ is limited, so that a total capacity of an entire battery pack does not drop due to the bucket effect in a case of a lower capacity retention rate of the first cell at low temperature.

In some embodiments, the capacity $Cap_A$ of the first cell satisfies the following condition: 90 Ah≤$Cap_A$≤300 Ah, and optionally, 140 Ah≤$Cap_A$≤260 Ah. In this way, the capacity $Cap_A$ of the first cell is limited within the foregoing range, ensuring that even in a low-temperature environment, a total capacity of an entire battery pack is not affected by a decrease in the capacity retention rate of the first cell due to large polarization of the first cell.

In some embodiments, the capacity $Cap_B$ of the second cell satisfies the following condition: 90 Ah≤$Cap_B$≤230 Ah, and optionally, 140 Ah≤$Cap_B$≤220 Ah. In this way, the capacity $Cap_B$ of the second cell is limited within the foregoing range, ensuring that even in a low-temperature environment, a total capacity of an entire battery pack is not affected by a decrease in the capacity retention rate of the second cell due to large polarization of the second cell.

In some embodiments, a positive electrode active substance of the first cell includes a lithium transition metal oxide represented by formula (I): $Li_{1+x1}Ni_aCo_bM^1_{1-a-b}O_{2-y1}A^1_{y1}$ formula (I), where 1≤x1≤0.2, 0.3≤a<0.95, 0<b<0.2, 0<a+b<1, 0≤y1<0.2, $M^1$ is selected from one or more of Mn, Fe, Cr, Ti, Zn, V, Al, Zr, and Ce, and $A^1$ is selected from one or more of S, F, Cl, and I; optionally, 0.5≤a<0.95, and 0<b<0.15; and optionally, assuming that a total weight of the positive electrode active substance of the first cell accounts for 100%, a weight percentage of the lithium transition metal oxide represented by the formula (I) is not less than 70%. In this way, the foregoing molecular formula is selected for the positive electrode active substance of the first cell, so that the capacity retention rate of the first cell at low temperature is greater than that of the second cell, and the resistance growth rate of the first cell is greater than that of the second cell.

In some embodiments, the positive electrode active substance of the second cell includes at least one of lithium containing phosphate represented by formula (II), lithium manganese-based oxide represented by formula (III), compound represented by formula (IV), compound represented by formula (V), and compound represented by formula (VI):

$LiFe_{1-x2-y2}Mn_{x2}M^2_{y2}PO_4$      formula (II), $Li_{1+x3}Mn_eM^3_{2-e}O_{4-d}A^3_d$      formula (III), $Na_{x4}M^4[M^{4'}(CN)6]_{y4}zH_2O$      formula (IV), $Na_2M^5_{x5}M^{5'}y5(PO_4)A^5$      formula (V), and $Na_{x6}M^6_{y6}Ni_{z6}Fe_{d6}Mn_{e6}O_{2\pm\delta}$      formula (VI).

where in formula (II), 0≤x2≤1, 0≤y2≤0.1, and $M^2$ is selected from at least one of transition metal elements other than Fe and Mn and non-transition metal elements;

in formula (III), −0.1≤x3≤0.2, 0<e≤2, 0≤d<1, $M^3$ is one or more of Ni, Fe, Cr, Ti, Zn, V, Al, Mg, Zr, and Ce, and $A^3$ is at least one of S, N, F, Cl, Br, and I;

in formula (IV), $M^4$ is a transition metal element, $M^{4'}$ is a transition metal element, 0<x4≤2, 0.8≤y4<1, and 0<z≤20; and optionally, $M^4$ and $M^{4'}$ are each independently selected from at least one of Mn, Fe, Co, Ni, Cu, Zn, V, and Cr;

in formula (V), $M^5$ and $M5'$ are each independently selected from at least one of Ti, V, Cr, Mn, Fe, Co, Ni, Cu, Zn, Ga, Sr, Y, Nb, Mo, Sn, Ba, and W, 0<x5<1, 0<y5<1, x5+y5=1, and $A^5$ is selected from at least one of F, Cl and Br;

in formula (VI), $M^6$ is a metal cation different from Ni, Fe and Mn, 0.67<x6<1.1, 0<y6<0.25, 0<z6<0.3, 0<y6+z6<0.55, 0.45<d6+e6<1, y6+z6+d6+e6=1, 0≤δ≤0.1, and $M^6$ is selected from at least one of $Li^+$, $Cu^{2+}$, $Zn^{2+}$, $Co^{2+}$, and $Ti^{4+}$; and optionally, 0.05<y6<0.15, and 0.05<z6<0.25; and optionally, the positive electrode active substance of the second cell includes at least one of $LiFePO_4$, $LiMnPO_4$, $LiMn_{0.4}Fe_{0.6}PO_4$, $LiV_{0.3}Fe_{0.7}PO_4$, $LiMn_2O_4$, and $LiMn_{1.9}Al_{0.1}O_4$. In this way, the foregoing molecular formula is selected for the positive electrode active substance of the second cell, so that the capacity retention rate of the first cell at low temperature is greater than that of the second cell, and the resistance growth rate of the first cell is greater than that of the second cell.

In some embodiments, assuming that a total weight of the positive electrode active substance of the second cell accounts for 100%, a weight percentage of the at least one of lithium containing phosphate represented by formula (II), lithium manganese-based oxide represented by formula (III), compound represented by formula (IV), compound represented by formula (V), and compound represented by formula (VI) is not less than 30%. In this way, a weight percentage of an optional molecular formula of the positive electrode active substance of the second cell is limited within the foregoing range, ensuring that energy of the second cell can better match the energy of the first cell.

In some embodiments, the first cells are arranged closer to an outer side of the battery module; and optionally, outermost cells of the battery module are all first cells. In this way, the first cells are disposed at the outer side of the battery module to further ward off external low temperature, thereby reducing impact of external environment on the temperature of the second cells, and further improving the power of the second cells.

In some embodiments, a thermal conductivity coefficient of a housing of the first cell is denoted as k1, a thermal conductivity coefficient of a housing of the second cell is denoted as k2, and 0.8≤k1/k2≤1.2 holds true; optionally, the thermal conductivity coefficient k1 of the housing of the first cell satisfies 20 W/(m·K)≤k1≤270 W/(m·K), and the thermal conductivity coefficient k2 of the second cell is 20 W/(m·K)≤k2≤250 W/(m·K); and further optionally, k1 satisfies 30 W/(m·K)≤k1≤250 W/(m·K), and the thermal conductivity coefficient k2 of the second cell satisfies 30 W/(m·K)≤k2≤250 W/(m·K). In this way, the first cell with a higher temperature can smoothly transfer surplus temperature to the second cell through heat transfer between aluminum housings, preventing heat transfer from being blocked due to an excessive thermal conductivity coefficient difference between the aluminum housings.

In some embodiments, an area of a largest thermal conductive surface between a first cell and a second cell that are adjacent to each other accounts for 60% to 100%, and optionally, 80% to 100%, of a total surface area of the first cell; and/or an area of a largest thermal conductive surface between a first cell and a second cell that are adjacent to each other accounts for 60% to 100%, and optionally, 80% to 100%, of a total surface area of the second cell. In this way, a proportion of the area of the largest thermal conductive surface between the first cell and the second cell that are adjacent to each other in the total surface area of the first cell and/or the total surface area of the second cell is limited, better ensuring heat transfer efficiency between the first cell and the second cell.

A second aspect of this disclosure provides a battery pack, including the battery module in the first aspect of this disclosure.

A third aspect of this disclosure provides an electric apparatus, including at least one of the battery module in the first aspect of this disclosure or the battery pack in the second aspect of this disclosure.

Compared with the prior art, this application has the following beneficial effects:

In a same low-temperature environment, compared with a conventional battery module, the low-temperature resistant battery module provided in this application can perform self-heating, and therefore transfer heat to a conventional battery, and also provide thermal insulation for the conventional battery by warding off external temperature. Therefore, the battery module in this application has a higher capacity retention rate and better power performance at low temperature.

Figure 1:
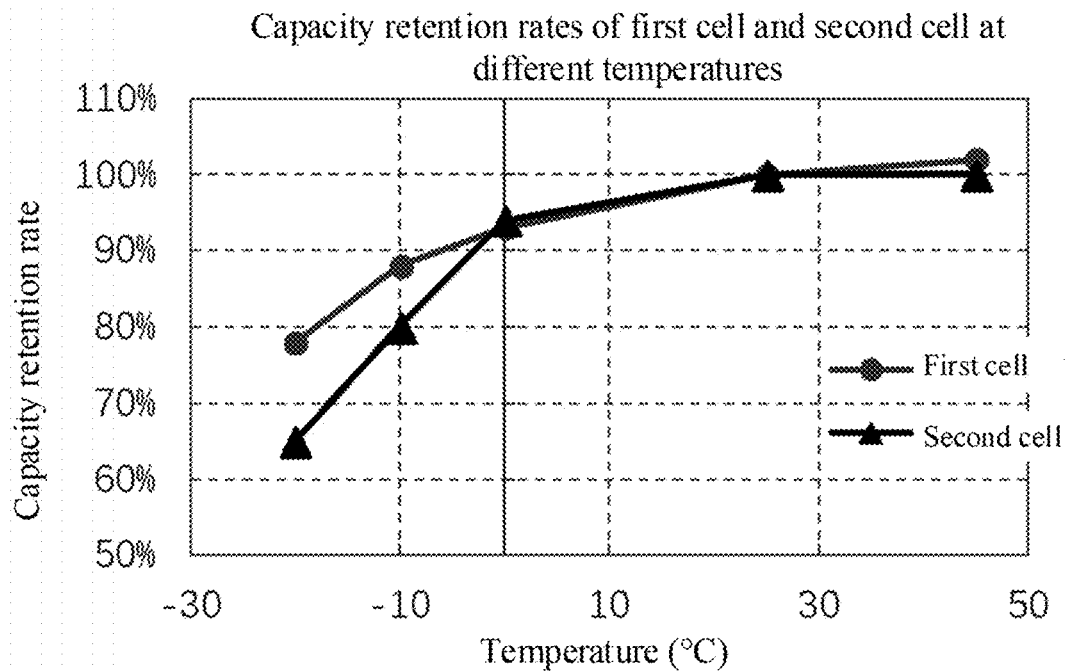
FIG. 1 is a comparison diagram of capacity retention rates of a ternary battery and an LFP battery at low temperature.

Reference signs are described as follows:

1. battery pack; 2. upper box body; 3. lower box body; 4. battery module; 5. secondary battery; 51. housing; 52. electrode assembly; and 53. top cover assembly.

DESCRIPTION OF EMBODIMENTS

The following specifically discloses embodiments of a low-temperature resistant battery module, a battery pack, and an electric apparatus in this application with appropriate reference to detailed descriptions of accompanying drawings. However, unnecessary detailed descriptions may be omitted. For example, detailed descriptions of a well-known matter or overlapping descriptions of an actual identical structure has been omitted. This is to avoid unnecessary cumbersomeness of the following descriptions, to facilitate understanding by persons skilled in the art. In addition, accompanying drawings and the following descriptions are provided for persons skilled in the art to fully understand this application and are not intended to limit the subject described in the claims.

"Ranges" disclosed in this application are defined in the form of lower and upper limits, given ranges are defined by selecting lower and upper limits, and the selected lower and upper limits define boundaries of special ranges. Ranges defined in the method may or may not include end values, and any combinations may be used, meaning any lower limit may be combined with any upper limit to form a range. For example, if ranges of 60-120 and 80-110 are provided for a specific parameter, it is understood that ranges of 60-110 and 80-120 can also be envisioned. In addition, if low limit values of a range are given as 1 and 2, and upper limit values of the range are given as 3, 4, and 5, the following ranges can all be envisioned: 1-3, 1-4, 1-5, 2-3, 2-4, and 2-5. In this application, unless otherwise stated, a value range of "a-b" is a short representation of any combination of real numbers between a and b, where both a and b are real numbers. For example, a value range of "0-5" means that all real numbers in the range of "0-5" are listed herein, and "0-5" is just a short representation of a combination of these values. In addition, when a parameter is expressed as an integer greater than or equal to 2, this is equivalent to disclosure that the parameter is, for example, an integer among 2, 3, 4, 5, 6, 7, 8, 9, 10, 11, 12, and so on.

Unless otherwise specified, all the embodiments and optional embodiments of this application can be mutually combined to form a new technical solution.

Unless otherwise specified, all the technical features and optional technical features of this application can be mutually combined to form a new technical solution.

Unless otherwise specified, all the steps in this application can be performed sequentially or randomly, or preferably, is performed sequentially. For example, a method including steps (a) and (b) indicates that the method may include steps (a) and (b) performed in sequence, or may include steps (b) and (a) performed in sequence. For example, that the method may further include step (c) indicates that step (c) may be added to the method in any order. For example, the method may include steps (a), (b), and (c), or steps (a), (c), and (b), or steps (c), (a), and (b), or the like.

Unless otherwise specified, "include" and "contain" mentioned in this application are inclusive or may be exclusive. For example, terms "include" and "contain" can mean that other unlisted components may also be included or contained, or only listed components may be included or contained.

Unless otherwise specified, in this application, the term "or" is inclusive. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present).

Battery Module

In this disclosure, a "cell" is a battery cell that can be charged and discharged independently. The cell includes a positive electrode plate, a negative electrode plate, a separator, an electrolyte, and an outer package for packaging the positive electrode plate, the negative electrode plate, the separator, and the electrolyte, and the like. The cell is not specifically limited in type and shape in this application. The cell may be a pouch cell, or may be a cylindrical cell, a prismatic cell, or another type of cell. The cell in this application may be a lithium-ion cell, a potassium-ion cell, a sodium-ion cell, a lithium-sulfur cell, or the like, and a lithium-ion cell is particularly preferred. During charging and discharging of the battery cell, active ions are intercalated and deintercalated back and forth between the positive electrode plate and the negative electrode plate. The electrolyte conducts ions between the positive electrode plate and the negative electrode plate.

In this disclosure, a "chemical system" of a cell is determined by a component of a positive electrode active material used by a positive electrode plate of the cell without considering a doping or coating element or substance of the positive electrode active material. For example, a cell whose positive electrode active material is lithium iron phosphate (including those doped with the Mn or V element) can be defined as a cell of a lithium iron phosphate chemical system, and a cell whose positive electrode active material is nickel cobalt lithium manganate (generally referred to as NCM for short) can be defined as a cell of an NCM chemical system. Further, the chemical system of the cell may be further defined by a relative percentage of nickel, cobalt, or manganese in the positive electrode active material. For example, a cell whose positive electrode active material is $LiNi_{0.5}Co_{0.2}Mn_{0.3}O_2$ (generally referred to as NCM523 for short) can be defined as a cell of an NCM523 chemical system, a cell whose positive electrode active material is $LiNi_{0.6}Co_{0.2}Mn_{0.2}O_2$ (generally referred to as NCM622 for short) can be defined as a cell of an a NCM622 chemical system, and a cell whose positive electrode active material is $LiNi_{0.8}Co_{0.1}Mn_{0.1}O_2$ (generally referred to as NCM811 for short) can be defined as a cell of an NCM811 chemical system. A cell whose positive electrode material is nickel cobalt lithium aluminate (generally referred to as NCA) can be defined as a cell of an NCA chemical system. In addition, in this application, a cell of a mixed system may alternatively be used, for example, a mixed-system cell including NCM and lithium iron phosphate.

In this disclosure, a "battery module" is formed by electrically connecting a specific quantity of cells and putting the cells into a frame to protect the cells from external impact, heat, vibration, and the like. The cell in this application may be cylindrical, rectangular, or of any other shapes.

In this disclosure, several cells may be assembled together to form a battery module, and the battery module contains two or more cells, and the specific quantity depends on application of the battery module and parameters of a single battery module.

Figure 6:
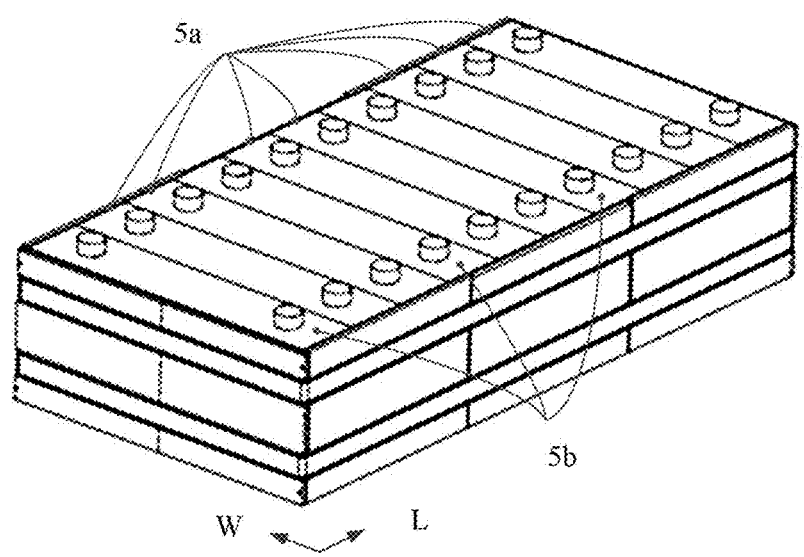
FIG. 6 is a schematic diagram of a battery module according to an embodiment of this application.

FIG. 6 is a schematic diagram showing an example of a battery module in this application. Referring to FIG. 6, in the battery module 4, a plurality of cells 5a and 5b may be sequentially arranged in a length direction of the battery module 4 (5a may indicate first cells and 5b may indicate second cells). Certainly, the cells may alternatively be arranged in any other manner. Further, the plurality of cells 5a and 5b may be fastened through fasteners. Optionally, the battery module 4 may further include a housing with an accommodating space, and the plurality of cells 5a and 5b are accommodated in the accommodating space.

In one embodiment, this application provides a battery module, including a first type of cell and a second type of cell that are cells of different chemical systems, where the first type of cell includes n first cells, the second type of cell includes m second cells, n and m each are selected from an integer greater than 1, at least one of the first cells and at least one of the second cells are electrically connected in series, and the first cell and the second cell satisfy at least conditions (1) to (3):

condition (1): $0.08 \leq \Delta R_B/\Delta R_A \leq 3.50$;

condition (2): 0.10 mΩ/100 cycles $\leq \Delta R_A \leq$ 0.40 mΩ/100 cycles, where $\Delta R_A$ is a discharge resistance growth rate of the first cell, and in particular a discharge resistance growth rate in a 25° C. cycling process measured in mΩ/100 cycles, and $\Delta R_B$ is a discharge resistance growth rate of the second cell, and in particular a discharge resistance growth rate in a 25° C. cycling process measured in mΩ/100 cycles; and condition (3): $IMP_B < IMP_A$, where $IMP_A$ is an alternating current impedance of the first cell, an alternating current impedance of the first cell at 25° C. and 1 kHz alternating current frequency in particular, and $IMP_B$ is an alternating current impedance of the second cell, an alternating current impedance of the second cell at 25° C. and 1 kHz alternating current frequency in particular.

At low temperature, a positive electrode material becomes less active, so that a quantity of mobile lithium ions that generate a discharge current decreases, which is a root cause of a decrease in capacity. In addition, at low temperature, abilities to diffuse and move of charged ions in positive and negative electrode materials are weakened, making it difficult for the charged ions to pass through a passivation film between an electrode and an electrolyte, a transfer speed of the charged ions in the electrolyte also decreases, and a lot of extra heat is generated in the transfer process. After the lithium ions reach a negative electrode, the diffusion of the lithium ions inside the negative electrode material also becomes less smooth. In the whole process, all charged particles are difficult to move. From an external perspective, this is because an internal resistance of the cell increases, resulting in a decreased discharge capacity and significant power degradation of the cell at low temperature.

The inventor(s) has accidentally found that the first type of cell and the second type of cell are disposed in the battery module in this application, where the two types of cells meet the foregoing characteristics and have different features in alternating current impedance and discharge resistance growth rate, the at least one of the first cells and the at least one of the second cells are electrically connected in series, an internal resistance of the first cell increases faster than an internal resistance of the second cell, and it can be learned according to the heat generation formula $Q=I^2RT$ that when under a same current in a circuit, a higher resistance indicates more heat. A larger resistance of the first type of cell indicates that more heat is generated in a same time period. During charging and discharging of the two types of cells connected in series, an amount of heat generated by the first type of cell is always greater than an amount of heat generated by the second type of cell, so that the first cell keeps generating more heat and transferring the heat to the second cell, that is, the first cell heats the second cell. Power and capacity performance of the second type of cell can be improved through heat transfer of the first type of cell to the second type of cell, thereby improving endurance mileage and power performance of a vehicle at low temperature.

The inventor(s) provides that a principle of battery power improvement at high temperature is as follows: When temperature decreases, an internal resistance of a battery increases, an electrochemical reaction slows down, a polarization internal resistance increases rapidly, and a discharge capacity and a discharge platform of the battery decrease, affecting power and energy output of the battery; and when temperature increases, a migration rate of lithium ions increases, fluidity of an electrolyte increases, a polarization internal resistance decreases, a discharge voltage platform increases, and a discharge current increases, thereby increasing power.

In some embodiments, in condition (1), a ratio of the discharge resistance growth rate of the first cell to the discharge resistance growth rate of the second cell may alternatively be, for example, $0.08 \leq \Delta R_B/\Delta R_A \leq 0.09$, $0.09 \leq \Delta R_B/\Delta R_A \leq 0.12$, $0.12 \leq \Delta R_B/\Delta R_A \leq 0.25$, $0.25 \leq \Delta R_B/\Delta R_A \leq 0.29$, $0.29 \leq \Delta R_B/\Delta R_A \leq 1.05$, $1.05 \leq \Delta R_B/\Delta R_A \leq 2.46$, $2.46 \leq \Delta R_B/\Delta R_A \leq 3.50$, $0.08 \leq \Delta R_B/\Delta R_A \leq 1.0$, $1.0 \leq \Delta R_B/\Delta R_A \leq 2.0$, $2.0 \leq \Delta R_B/\Delta R_A \leq 3.0$, $3.0 \leq \Delta R_B/\Delta R_A \leq 3.50$, or the like. In this way, a power increase caused by temperature rise of the first cell is larger than power loss caused by an increase in the internal resistance of the second cell, thereby improving overall power. In addition, it can also be ensured that a resistance increase of the first cell is not excessively larger than that of the second cell, thereby avoiding an excessive increase in the overall impedance.

In some embodiments, in condition (2), the discharge resistance growth rate $\Delta R_A$ of the first cell may alternatively satisfy 0.10 m$\Omega$/100 cycles$\leq\Delta R_A\leq$0.20 m$\Omega$/100 cycles, 0.20 m$\Omega$/100 cycles$\leq\Delta R_A\leq$0.30 m$\Omega$/100 cycles, 0.30 m$\Omega$/100 cycles$\leq\Delta R_A\leq$0.40 m$\Omega$/100 cycles, 0.10 m$\Omega$/100 cycles$\leq\Delta R_A\leq$0.20 m$\Omega$/100 cycles, 0.20 m$\Omega$/100 cycles$\leq\Delta R_A\leq$0.40 m$\Omega$/100 cycles, or the like. In this application, the discharge resistance growth rate $\Delta R_A$ of the first cell is limited within an appropriate range, and the discharge resistance growth rate $\Delta R_B$ of the second cell is also taken into account, so that even at an end phase of cycling, the first cell can generate more heat than the second cell, and therefore the first cell continues to heat the second cell to improve the overall power.

In some embodiments, at least part of the first cell and at least part of the second cell are in thermal contact. Generally, thermal contact between the first cell and the second cell is not specifically limited in form. For example, there may be a specified contact area between at least the parts of the first cell and the second cell. For another example, a largest side of the first cell and a largest side of the second cell are in close contact with each other or a thermally conductive sheet may be added between two sides. In this application, the thermal contact between the at least part of the first cell and the at least part of the second cell can ensure good heat transfer efficiency between the first cell and the second cell.

In some embodiments, the discharge resistance growth rate $\Delta R_B$ of the second cell may alternatively satisfy the following condition: 0.03 m$\Omega$/100 cycles$\leq\Delta R_B\leq$0.35 m$\Omega$/100 cycles, 0.03 m$\Omega$/100 cycles$\leq\Delta R_B\leq$0.1 m$\Omega$/100 cycles, 0.1 m$\Omega$/100 cycles$\leq\Delta R_B\leq$0.15 m$\Omega$/100 cycles, 0.15 m$\Omega$/100 cycles$\leq\Delta R_B\leq$0.25 m$\Omega$/100 cycles, 0.25 m$\Omega$/100 cycles$\leq\Delta R_B\leq$0.35 m$\Omega$/100 cycles; 0.03 m$\Omega$/100 Cycles$\leq\Delta R_B\leq$0.05 m$\Omega$/100 cycles, 0.05 m$\Omega$/100 cycles$\leq\Delta R_B\leq$0.32 m$\Omega$/100 cycles, 0.32 m$\Omega$/100 cycles$\leq\Delta R_B\leq$0.35 m$\Omega$/100 cycles, or the like, and optionally, 0.05 m$\Omega$/100 cycles$\leq\Delta R_B\leq$0.32 m$\Omega$/100 cycles. In this application, the discharge resistance growth rate $\Delta R_B$ of the second cell is limited, and the discharge resistance growth rate $\Delta R_A$ of the first cell satisfies 0.10 m$\Omega$/100 cycles$\leq\Delta R_A\leq$0.40 m$\Omega$/100 cycles, so that even at an end phase of cycling, it can be ensured that the first cell can generate more heat than the second cell, and therefore the first cell continues to heat the second cell to improve the overall power.

In this disclosure, in condition (3), the alternating current impedance (IMP$_B$) of the second cell is less than the alternating current impedance (IMP$_A$) of the first cell. The reason why IMP$_B$<IMP$_A$ is defined is as follows: In a physical sense, alternating current internal resistance of a battery is similar to ohmic internal resistance (that is, internal impedance of the battery), which includes ionic resistance of an electrolyte, electronic resistance of positive and negative electrode active substances, current collectors, lead wires, and the like, and contact resistance of active substances and current collectors. However, direct current internal resistance includes the ohmic internal resistance and active impedance, which is polarization. The alternating current impedance is closely related to frequency. A point corresponding to the alternating current impedance may be found in an impedance spectrogram, and content included in an alternating current impedance spectrogram may be determined based on an interval to which the point belongs (which is indicated by a modulo of 1000 Hz for lithium batteries, and is numerically similar to the ohmic impedance. The ohmic impedance is the foregoing ionic resistance of the electrolyte, the electronic resistance of the positive and negative electrode active substances, the electronic resistance of the current collectors and the lead wires, and contact resistance of the active substances, the current collectors, and tab welding parts). The direct current internal resistance is generally a ratio of a difference between terminal voltages to a difference between the corresponding currents of the battery, namely $\Delta U/\Delta I$, and is also a variable value. Due to existence of polarization, direct current internal resistance includes ohmic resistance and polarization resistance, and the polarization resistance includes electrochemical polarization and concentration polarization, and all of them have their corresponding time constants that can be determined by using an electrochemical impedance spectrogram). There is a voltage rise (or fall) after charge and discharge and polarization of a battery because a speed of another reaction inside the battery is slower than a speed of electrons (ohmic impedance). In addition, regarding power improvement at low temperature, poor power performance at low temperature is mainly caused by large polarization resistance of the battery at low temperature and ohmic resistance, namely caused by direct current internal resistance. In order to reduce polarization of the battery, it is necessary to increase battery temperature. This mainly utilizes heat generated by the ohmic resistance IMP. Therefore, in order to increase power, the alternating current impedance (IMP$_A$) of the first cell needs to be greater than the alternating current impedance (IMP$_B$) of the second cell, so that the first cell generates more heat than the second cell, thereby increasing power of the second cell. In other words, heat generated by the battery is mainly related to the ohmic resistance. The alternating current impedance can better represent a magnitude of the ohmic impedance because interference of the polarization impedance is eliminated, so that the alternating current impedance can better represent a heating capability of the battery.

In some embodiments, the alternating current impedance IMP$_A$ of the first cell further satisfies the following condition: 0.08 m$\Omega\leq$IMP$_A\leq$2 m$\Omega$, 0.08 m$\Omega\leq$IMP$_A\leq$0.1 m$\Omega$, 0.1 m$\Omega\leq$IMP$_A\leq$0.3 m$\Omega$, 0.3 m$\Omega\leq$IMP$_A\leq$0.5 m$\Omega$, 0.5 m$\Omega\leq$IMP$_A\leq$0.8 m$\Omega$, 0.8 m$\Omega\leq$IMP$_A\leq$1 m$\Omega$, 1 m$\Omega\leq$IMP$_A\leq$1.2 m$\Omega$, 1.2 m$\Omega\leq$IMP$_A\leq$1.5 m$\Omega$, 1.5 m$\Omega\leq$IMP$_A\leq$1.8 m$\Omega$, 1.8 m$\Omega\leq$IMP$_A\leq$2 m$\Omega$; 0.1 m$\Omega\leq$IMP$_A\leq$1.2 m$\Omega$, 1.2 m$\Omega\leq$IMP$_A\leq$2.0 m$\Omega$, or the like, and optionally, 0.1 m$\Omega\leq$IMP$_A\leq$1.2 m$\Omega$. In this application, the alternating current impedance IMP$_A$ of the first cell is limited within an appropriate range, allowing the first cell to release more initial heat than the second cell, thereby increasing power of the second cell.

In some embodiments, the alternating current impedance IMP$_B$ of the second cell further satisfies the following condition: 0.05 m$\Omega\leq$IMP$_B\leq$1.5 m$\Omega$ 0.05 m$\Omega\leq$IMP$_B\leq$0.09 m$\Omega$, 0.09 m$\Omega\leq$IMP$_B\leq$1.5 m$\Omega$; 0.05 m$\Omega\leq$IMP$_B\leq$0.09 m$\Omega$, 0.09 m$\Omega\leq$IMP$_B\leq$1.0 m$\Omega$, 1.0 m$\Omega\leq$IMP$_B\leq$1.2 m$\Omega$ 1.2 m$\Omega\leq$IMP$_B\leq$1.5 m$\Omega$, or the like, and optionally, 0.09 m$\Omega\leq$IMP$_B\leq$1 m$\Omega$. In this application, the alternating current impedance IMP$_B$ of the second cell is limited within an appropriate range, allowing the first cell to release more initial heat than the second cell, thereby increasing power of the second cell.

In some embodiments, the first cell and the second cell further satisfy the following relationship: 1$\leq$Cap$_A$/Cap$_B\leq$1.9, 1$\leq$Cap$_A$/Cap$_B\leq$1.2, 1.2$\leq$Cap$_A$/Cap$_B\leq$1.5, 1.5$\leq$Cap$_A$/

$Cap_B \leq 1.6$, $1.6 \leq Cap_A/Cap_B < 1.9$; $1 \leq Cap_A/Cap_B \leq 1.1$, $1.1 \leq Cap_A/Cap_B \leq 1.6$, $1.6 \leq Cap_A/Cap_B \leq 1.9$, or the like, and optionally, $1.1 \leq Cap_A/Cap_B \leq 1.6$, where $Cap_A$ is a capacity of the first cell, and $Cap_B$ is a capacity of the second cell. Because in a low-temperature environment, the capacity retention rates of both the first cell and the second cell decrease due to large polarization of the first cell and the second cell. However, the first cell is closer to an external environment, so that the capacity retention rate of the first cell is lower. Therefore, in order to keep a total capacity of the whole battery module from dropping due to the bucket effect in a case of a lower capacity retention rate of the first cell at low temperature, it is necessary to define a proportional relationship between the capacity $Cap_A$ of the first cell and the capacity $Cap_B$ of the second cell within the foregoing appropriate range.

In some embodiments, the capacity $Cap_A$ of the first cell satisfies the following condition: 90 Ah≤$Cap_A$≤300 Ah, 90 Ah≤$Cap_A$≤120 Ah, 120 Ah≤$Cap_A$≤150 Ah, 150 Ah≤$Cap_A$≤180 Ah, 180 Ah≤$Cap_A$≤200 Ah, 200 Ah≤$Cap_A$≤220 Ah, 220 Ah≤$Cap_A$≤250 Ah, 250 Ah≤$Cap_A$≤280 Ah, 280 Ah≤$Cap_A$≤300 Ah; 90 Ah≤$Cap_A$≤140 Ah, 140 Ah≤$Cap_A$≤260 Ah, 260 Ah≤$Cap_A$≤300 Ah, or the like, and optionally, 140 Ah≤$Cap_A$≤260 Ah. In this application, the capacity $Cap_A$ of the first cell is limited within the foregoing range, ensuring that even in a low-temperature environment, a total capacity of an entire battery pack is not affected by a decrease in the capacity retention rate of the first cell due to large polarization of the first cell.

In some embodiments, the capacity $Cap_B$ of the second cell satisfies the following condition: 90 Ah≤$Cap_B$≤230 Ah, 90 Ah≤$Cap_B$≤120 Ah, 120 Ah≤$Cap_B$≤150 Ah, 150 Ah≤$Cap_B$≤180 Ah, 180 Ah≤$Cap_B$≤200 Ah, 200 Ah≤$Cap_B$≤230 Ah; 90 Ah≤$Cap_B$≤140 Ah, 140 Ah≤$Cap_B$≤220 Ah, 220 Ah≤$Cap_B$≤230 Ah, or the like, and optionally, 140 Ah≤$Cap_B$≤220 Ah. In this application, the capacity $Cap_B$ of the second cell is limited within the foregoing range, ensuring that even in a low-temperature environment, a total capacity of an entire battery pack is not affected by a decrease in the capacity retention rate of the second cell due to large polarization of the second cell.

In some embodiments, a positive electrode active substance of the first cell includes a lithium transition metal oxide represented by formula (I): $Li_{1+x1}Ni_aCo_bM^1_{1-a-b}O_{2-y1}A^1_{y1}$ formula (I), where x1 may usually satisfy −0.1≤x1≤0.2, −0.1≤x1<0, 0≤x1≤0.1, 0.1≤x1≤0.2; −0.1≤x1≤−0.05, −0.05≤x1<0, 0≤x1≤0.05, 0.05≤x1≤0.1, 0.1≤x1≤0.15, 0.15≤x1≤0.2, or the like. a may usually satisfy 0.3≤a<0.95, 0.3≤a<0.5, 0.5≤a<0.95; 0.3≤a<0.45, 0.45≤a<0.55, 0.55≤a<0.65, 0.65≤a<0.75, 0.75≤a<0.85, 0.85≤a<0.95, or the like. b may usually satisfy 0<b<0.2, 0<b<0.1, 0.1<b<0.2, 0<b<0.05, 0.05<b<0.1, 0.1<b<0.15, 0.15<b<0.2, or the like. a+b may usually satisfy 0<a+b<1, 0<a+b<0.05, 0.05<a+b<1; 0<a+b<0.1, 0.1<a+b<0.2, 0.2<a+b<0.3, 0.3<a+b<0.4, 0.4<a+b<0.5, 0.5<a+b<0.6, 0.6<a+b<0.7, 0.7<a+b<0.8, 0.8<a+b<0.9, 0.9<a+b<1, or the like. y1 may usually satisfy 0≤y1<0.2, 0≤y1<0.1, 0.1≤y1<0.2, 0<y1<0.05, 0.05<y1<0.1, 0.1≤y1<0.15, 0.15<y1<0.2, or the like. $M^1$ is selected from one or more of Mn, Fe, Cr, Ti, Zn, V, Al, Zr, and Ce. $A^1$ is selected from one or more of S, F, Cl, and I. Optionally, 0.5≤a<0.95, and 0<b<0.15. Optionally, assuming that a total weight of the positive electrode active substance of the first cell accounts for 100%, a weight percentage of the lithium transition metal oxide represented by formula (I) is not less than 70%, for example, 70%-95%, 70%-75%, 75%-80%, 80%-85%, 85%-90%, or 90%-98%. In this application, the foregoing molecular formula is selected for the positive electrode active substance of the first cell, so that the capacity retention rate of the first cell at low temperature is greater than the capacity retention rate of the second cell at low temperature, and the resistance growth rate of the first cell is greater than the resistance growth rate of the second cell.

In some embodiments, the positive electrode active substance of the second cell includes at least one of lithium containing phosphate represented by formula (II), lithium manganese-based oxide represented by formula (III), compound represented by formula (IV), compound represented by formula (V), and compound represented by formula (VI):

$LiFe_{1-x2-y2}Mn_{x2}M^2_{y2}PO_4$      formula (II),

$Li_{1+x3}Mn_eM^3_{2-e}O_{4-d}A^3_d$      formula (III),

$Na_{x4}M^4[M^{4'}(CN)_6]_{y4}zH_2O$      formula (IV),

$Na_2M^5_{x5}M^{5'}_{y5}(PO_4)A^5$      formula (V), and

$Na_{x6}M^6_{y6}Ni_{z6}Fe_{d6}Mn_{e6}O_{2±\delta}$      formula (VI).

In formula (II), x2 may usually satisfy 0≤x2≤1, 0≤x2≤0.5, 0.5≤x2≤1; 0≤x2≤0.2, 0.2<x2≤0.5, 0.5<x2≤0.8, 0.8<x2≤1, or the like; y2 may usually satisfy 0≤y2≤0.1, 0≤y2≤0.05, 0.05≤y2≤0.1, 0≤y2≤0.02, 0.02≤y2≤0.05, 0.05≤y2≤0.08, 0.08≤y2≤0.1, or the like; and $M^2$ is selected from at least one of transition metal elements other than Fe and Mn and non-transition metal elements.

In formula (III), x3 may satisfy, for example, −0.1≤x3≤0.2, −0.1≤x3≤0, 0≤x3≤0.1, 0.1≤x3≤0.2, −0.1≤x3≤−0.05, −0.05≤x3<0, 0≤x3≤0.05, 0.05≤x3≤0.1, 0.1≤x3≤0.15, 0.15≤x3≤0.2, or the like; e may satisfy 0<e≤2, 0<e≤1, 1<e≤2, 0<e≤0.5, 0.5<e≤1, 1<e≤1.5, 1.5<e≤2, or the like; d may usually satisfy 0≤d<1, 0<d<0.5, 0.5≤d<1, 0≤d<0.2, 0.2≤d<0.5, 0.5≤d<0.8, 0.8≤d<1, or the like; and $M^3$ is at least one of Ni, Fe, Cr, Ti, Zn, V, Al, Mg, Zr, and Ce, and $A^3$ is at least one of S, N, F, Cl, Br, and I.

In formula (IV), $M^4$ is a transition metal element, $M^{4'}$ is a transition metal element, and x4 may satisfy, for example, 0<x4≤2, 0<x4≤1, 1<x4≤2, 0<x4≤0.5, 0.5<x4≤1, 1<x4≤1.5, 1.5<x4≤2, or the like; y4 may satisfy, for example, 0.8≤y4<1, 0.8≤y4≤0.9, 0.9≤y4<1.0, or the like; for example, z may satisfy 0<z≤20, 0<z≤5, 5<z≤10, 10<z≤15, 15<z≤20, or the like; and optionally, M4 and $M^{4'}$ are each independently selected from at least one of Mn, Fe, Co, Ni, Cu, Zn, V, and Cr.

In formula (V), $M^5$ and $M^{5'}$ are each independently selected from at least one of Ti, V, Cr, Mn, Fe, Co, Ni, Cu, Zn, Ga, Sr, Y, Nb, Mo, Sn, Ba, and W; x5 may satisfy, for example, 0<x5<1, 0<x5<0.5, 0.5<x5<1, or the like; y5 may satisfy, for example, 0<y5<1, 0<y5<0.5, 0.5<y5<1, or the like; and x5+y5=1; and $A^5$ is selected from at least one of F, Cl and Br.

In formula (VI), $M^6$ is a metal cation other than Ni, Fe and Mn, and x6 may satisfy, for example, 0.67<x6<1.1, 0.67<x6<0.8, 0.8<x6<1.1, or the like; y6 may, for example, satisfy 0<y6<0.25, 0<y6<0.05, 0.05<y6<0.15, 0.15<y6<0.25, or the like; z6 may, for example, satisfy 0<z6<0.3, 0<z6<0.05, 0.05<z6<0.25, 0.25<z6<0.3, or the like; y6+z6 may satisfy, for example, 0<y6+z6<0.55, 0<y6+z6<0.35, 0.35<y6+z6<0.55, or the like; d6+e6 may satisfy, for example, 0.45<d6+e6<1, 0.45<d6+e6<0.65, 0.65<d6+e6<1, or the like, and y6+z6+d6+e6=1; δ may satisfy, for example, 0≤δ≤0.1, 0≤δ≤0.05, 0.05≤δ≤0.1, or the like; and $M^6$ is selected from at least one of $Li^+$, $Cu^{2+}$, $Zn^{2+}$, $Co^{2+}$, and $Ti^{4+}$, and optionally, 0.05<y6<0.15, 0.05<z6<0.25.

Optionally, the positive electrode active substance of the second cell includes at least one of $LiFePO_4$, $LiMnPO_4$, $LiMn_{0.4}Fe_{0.6}PO_4$, $LiV_{0.3}Fe_{0.7}PO_4$, $LiMn_2O_4$, and $LiMn_{1.9}Al_{0.1}O_4$. In this way, the foregoing molecular formula is selected for the positive electrode active substance of the second cell, so that the capacity retention rate of the first cell at low temperature is greater than the capacity retention rate of the second cell at low temperature, and the cycling resistance growth rate of the first cell is greater than the cycling resistance growth rate of the second cell. It can be learned from FIG. 1 that a capacity retention rate of the ternary battery at low temperature is greater than that of LEP. It can be learned from FIG. 2 that a cycling temperature rise of a ternary material such as NCM is larger than that of LEP. Therefore, it is more suitable to use a ternary material such as NCM for the first cell, and LEP for the second cell.

In some embodiments, assuming that a total weight of the positive electrode active substance of the second cell accounts for 100%, a weight percentage of the at least one of lithium containing phosphate represented by formula (II), lithium manganese-based oxide represented by formula (III), compound represented by formula (IV), compound represented by formula (V), and compound represented by formula (VI) is not less than 30%. For another example, it may be 30% to 95%, 30% to 40%, 40% to 50%, 50% to 60%, 60% to 70%, 70% to 80%, 80% to 98%, or the like. In this way, a weight percentage of an optional molecular formula of the positive electrode active substance of the second cell is limited within the foregoing range, ensuring that energy performance of the second cell can be optimal and better match energy of the first cell.

Figure 3:
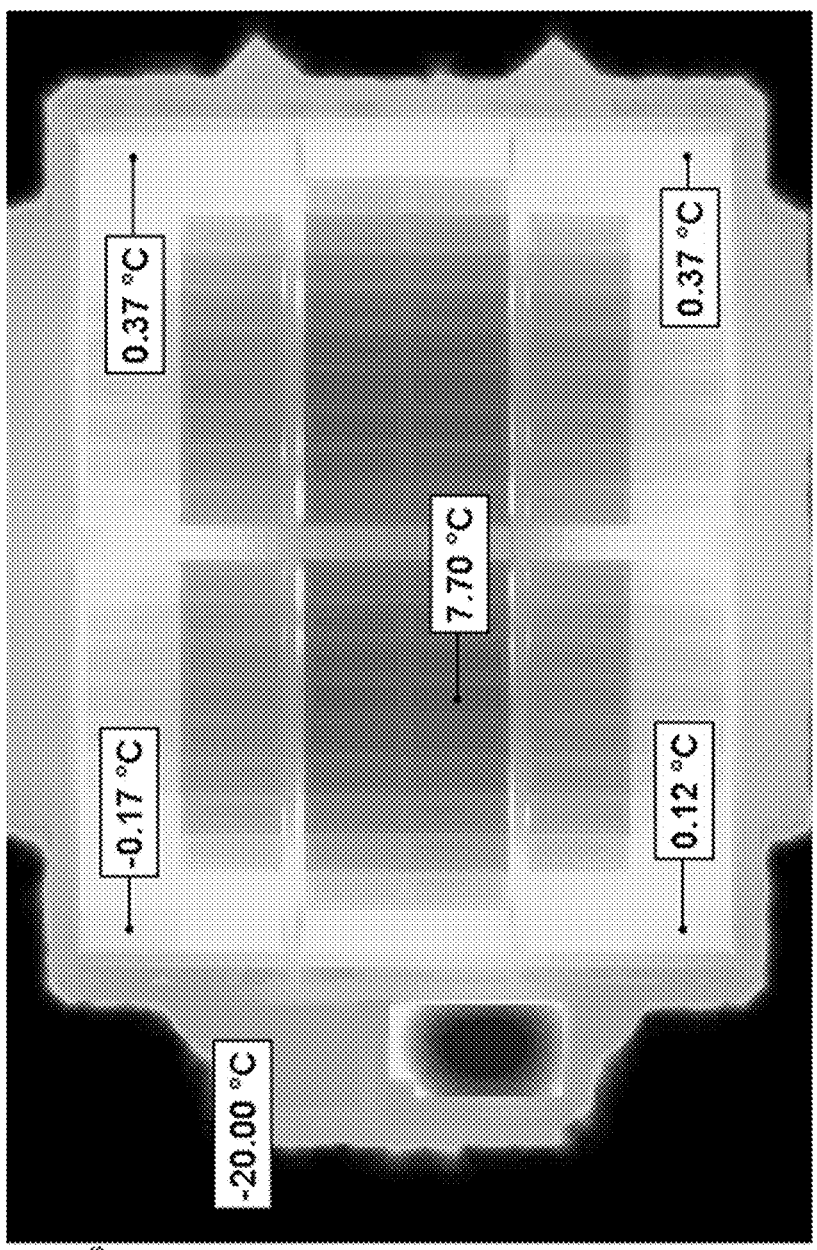
FIG. 3 shows temperature change of a conventionally arranged battery pack.
Figure 4:
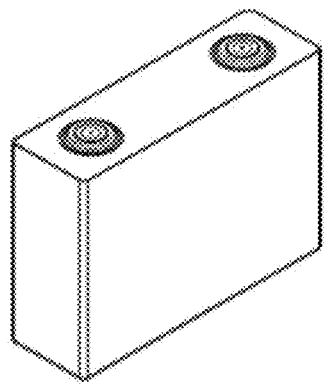
FIG. 4 is a schematic diagram of a secondary battery according to an embodiment of this application.
Figure 5:
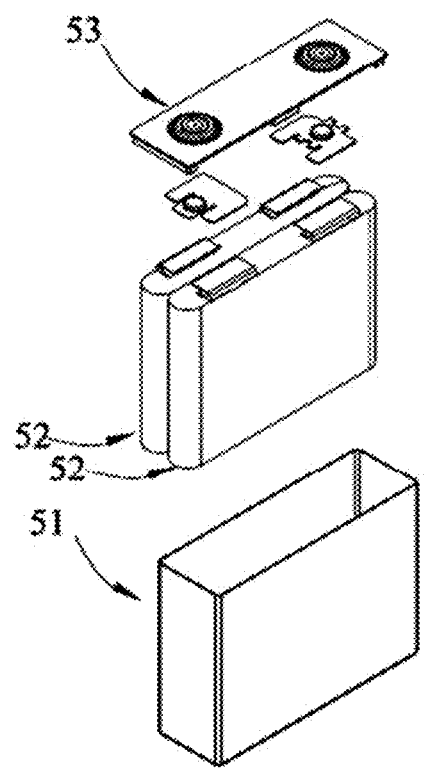
FIG. 5 is an exploded view of the secondary battery according to the embodiment of this application in FIG. 4.

It can be learned from temperature change of a conventionally arranged battery pack in FIG. 3, being closer to an outer side of the battery module means having a more significant change in temperature. Therefore, in some embodiments, the first cells are arranged closer to the outer side of the battery module; and optionally, outermost cells of the battery module are all first cells. Observed from a cross-section of the battery module, the first cells are disposed closer to two sides of the battery module. In this way, the first cells are disposed at the outer side of the battery module to further ward off external low temperature, thereby reducing impact of external environment on the temperature of the second cells, and further improving the power of the second cells. In some specific embodiments, for example, if the cells are stacked in a thickness direction, with a largest side laying flat, that is, the first cells are closer to upper and lower surfaces of the battery module, and the second cells with poorer performance at low temperature are stacked close to the middle of battery module in the thickness direction and also sequentially arranged in a horizontal direction, the first cells are at an outermost layer and the second cells are far away from external environment. For another example, the cells are sequentially arranged in a transverse direction with largest sides in a vertical direction. When the first cells and the second cells are vertically arranged, the second cells with poorer performance at low temperature are preferably arranged at a central zone of the battery module or battery pack, and the first cells with better performance at low temperature are closer to external environment to provide thermal insulation. For another example, the first cells with better performance at low temperature are preferably arranged close to two largest sides of the second cells with poorer performance at low temperature.

In some embodiments, a thermal conductivity coefficient of a housing of the first cell is denoted as k1, and a thermal conductivity coefficient of a housing of the second cell is denoted as k2. Usually, in a physical sense, thermal conductivity coefficient refers to an amount of heat transferred through an area of 1 square meter of a material with 1 m in thickness with a temperature difference of 1 degree (K, ° C.) between surfaces on two sides under a stable heat transfer condition for a specified period of time and measured in watts/m·k (W/(m·K), where K may be replaced with ° C.). A greater thermal conductivity coefficient indicates that a substance has a greater ability to transfer heat. Therefore, a thermal conductivity coefficient is an indicator of a heat transfer ability of a substance and is one of physical properties of the substance. Different substances have different thermal conductivity coefficients. When a heat transfer rate needs to be increased, a material with a high thermal conductivity coefficient can be selected. Otherwise, when a heat transfer rate needs to be decreased, a material with a low thermal conductivity coefficient should be selected. In this application, the thermal conductivity coefficients k1 and k2 are used to reflect a rate of heat transfer from the inside to the outside of the battery and a rate of heat transfer between batteries.

In this application, the thermal conductivity coefficient of the housing of the first cell and the thermal conductivity coefficient of the housing of the second cell satisfy $0.8 \leq k1/k2 \leq 1.2$, and optionally, $0.8 \leq k1/k2 \leq 1.0$, $1.0 \leq k1/k2 \leq 1.2$, $0.8 \leq k1/k2 \leq 0.9$, $0.9 \leq k1/k2 \leq 1.0$, $1.0 \leq k1/k2 \leq 1.1$, $1.1 \leq k1/k2 \leq 1.2$, or the like.

Further, the thermal conductivity coefficient k1 of the housing of the first cell satisfies $20$ W/(m·K)$\leq k1 \leq 270$ W/(m·K), and optionally, $20$ W/(m·K)$\leq k1 \leq 30$ W/(m·K), $30$ W/(m·K)$\leq k1 \leq 250$ W/(m·K), $250$ W/(m·K)$\leq k1 \leq 270$ W/(m·K), or the like.

Further, the thermal conductivity coefficient k2 of the second cell satisfies $20$ W/(m·K)$\leq k2 \leq 250$ W/(m·K). Optionally, the thermal conductivity coefficient k2 of the second cell satisfies $20$ W/(m·K)$\leq k1 \leq 30$ W/(m·K), $30$ W/(m·K)$\leq k2 \leq 250$ W/(m·K), or the like.

In this application, k1/k2, k1, and k2 are limited within an appropriate range, that is, when a difference between k1 and k2 is small, it can be regarded that a rate of heat transfer from the high-temperature battery to the largest side contacted by the low-temperature battery is approximately equal to a rate for heat absorption by the low-temperature battery at the contacted surface. Otherwise, if the difference between k1 and k2 is too large, the heat transfer is considered to be hindered.

In some embodiments, an area of a maximum heat transfer surface between the first cell and the second cell that are adjacent to each other may be 50 cm² to 400 cm², 50 cm² to 100 cm², 100 cm² to 300 cm² 300 cm² to 400 cm²; 50 cm² to 150 cm², 150 cm² to 250 cm², 250 cm² to 400 cm²; 50 cm² to 100 cm² 100 cm² to 150 cm², 150 cm² to 200 cm², 200 cm² to 250 cm², 250 cm² to 300 cm², 300 cm² to 350 cm², 350 cm² to 400 cm², or the like, and preferably, 100 cm² to 300 cm², and most preferably, 150 cm² to 250 cm². The area of the largest heat transfer surface between the first cell and the second cell that are adjacent to each other may account for 60% to 100%, 60% to 80%, 80% to 100%, 60% to 70%, 70% to 80%, 80% to 90%, 90% to 100%, or the like of a total surface area of the first cell, and optionally, 80% to 100%. The area of the largest heat transfer surface between the first cell and the second cell that are adjacent to each other accounts for 60% to 100%, 60% to 80%, 80% to 100%, 60% to 70%, 70% to 80%, 80% to 90%, 90% to 100%, or the like of a total surface area of the second cell, and optionally, 80% to 100%. In this application, the area of the largest heat transfer surface between the first cell and the second cell that are adjacent to each other, and ratios of the area of the largest heat transfer surface between the first cell and the second cell that are adjacent to each other to the total surface area of the first cell and to the total surface area of the second cell are all limited, better ensuring heat transfer efficiency between the first cell and the second cell.

In this application, a discharge resistance growth rate ($\Delta R_A$ or $\Delta R_B$) of a cell at 25° C. has a meaning well-known in the art, and can be tested by using an instrument and a method that are well-known in the art. In an example, the test may be carried out in the following method: A cell is fully charged at a constant current and a constant voltage to an upper limit V1 of a design voltage of the cell at 25° C., and then discharged for 10 seconds (T) at a discharge rate of 4C, and a voltage of the cell at this time is recorded and denoted as V2. A discharge resistance of the cell is R=(V1−V2)/I. A discharge resistance growth rate $\Delta R$ of the cell is obtained by charging and discharging the cell for 100 cycles, recording discharge resistances R1 and R100 at the first cycle and the 100th cycle of the cell during cycling. The discharge resistance growth rate $\Delta R$ of the cell=R100−R1 and measured in m$\Omega$/100 cycles.

In this application, an alternating current impedance ($IMP_A$) of a cell has a meaning well-known in the art, and can be tested using an instrument and a method that are well-known in the art. In an example, an HIOKI BT3562 battery tester made in Japan may be used as a test instrument to perform testing in the following steps at 25° C.±5° C.:
  (a) Charge the battery to a specified voltage value of a cell at a constant current of 0.2 C/h, and leave it to stand for 1 to 4 hours.
  (b) Adopt an alternating current-voltage method: Let an alternating current Ia pass through the cell, and then measure voltage drops Ua between two ends of the cell, where a frequency of a test signal is 1 KHz±0.1 KHz and is a sine wave, a test current is 50 mA, or when an alternating current signal passes through a battery, voltage drops between two ends of the cell do not exceed 20 mV.

In this application, a capacity of a cell has a meaning well-known in the art, and can be tested using an instrument and a method that are well-known in the art. In an example, the following method may be used for testing: Within upper and lower limits of a rated voltage specified by the cell, charge the cell to the upper voltage limit at a constant current of 0.33 C and a constant voltage at 25° C., and then discharge the cell to the lower voltage limit at 0.33 C, where power that is discharged (Ah) is a cell capacity.

In this application, a thermal conductivity coefficient of a housing of a cell has a meaning well-known in the art, and can be tested using an instrument and a method that are well-known in the art. The thermal conductivity coefficient is tested using a dynamic method and a steady-state method, and the steady-state method further includes a heat flow meter method and a guarded hot plate method. In an example, the following method may be used for testing: Perform test using the guarded hot plate method in accordance with the GB/T10294-2008 standard.

In addition, the following describes a cell used in a battery module, a battery pack, and an electric apparatus in this application with appropriate reference to the accompanying drawings.

[Cell]

The following describes basic structures of a negative electrode plate, a positive electrode plate, an electrolyte, and a separator of a cell in this application. It should be noted that one or more of a positive electrode plate, a separator, a negative electrode plate, an electrolyte, and the like of a first type of cell and/or a second type of cell in this application may be adjusted so that a discharge resistivity and an alternating current impedance of each of the cell fall within a required range.

<Positive Electrode Plate>

In the cell in this application, a positive electrode plate includes a positive electrode current collector and a positive electrode film layer that is disposed on at least one surface of the positive electrode current collector and that includes a positive electrode active material. For example, the positive electrode current collector has two back-to-back surfaces in its thickness direction, and the positive electrode film layer is provided on either or both of the two back-to-back surfaces of the positive electrode current collector. In the cell of this application, the positive electrode current collector may be a metal foil or a composite current collector. For example, the metal foil may be aluminum foil, and the composite current collector may include a polymer matrix and a metal layer formed on at least one surface of the polymer matrix. The composite current collector may be formed by forming a metal material (for example, aluminum, aluminum alloy, nickel, nickel alloy, titanium, titanium alloy, silver, and silver alloy) on the polymer matrix (for example, a matrix of polypropylene PP, polyethylene glycol terephthalate PET, polybutylene terephthalate PBT, polystyrene PS, polyethylene PE, or copolymers thereof).

In the cell of this application, the positive electrode active material may be a commonly known positive electrode active material used for cells in the art. For example, the positive electrode active material may include one or more of the following: olivine-structured lithium-containing phosphate, lithium transition metal oxide, and respective modified compounds thereof. However, this application is not limited to such materials, and may alternatively use other conventional materials that can be used as positive electrode active materials for cells. One of these positive electrode active materials may be used alone, or two or more of them may be used in combination. Examples of the lithium transition metal oxide may include, but are not limited to, one or more of lithium cobalt oxide (for example, $LiCoO_2$), lithium nickel oxide (for example, $LiNiO_2$), lithium manganese oxide (for example, $LiMnO_2$ and $LiMn_2O_4$), lithium nickel cobalt oxide, lithium manganese cobalt oxide, lithium nickel manganese oxide, lithium nickel cobalt manganese oxide (for example, $LiNi_{1/3}Co_{1/3}Mn_{1/3}O_2$ (NCM333), $LiNi_{0.5}Co_{0.2}Mn_{0.3}O_2$ (NCM523), $LiNi_{0.5}Co_{0.25}Mn_{0.25}O_2$ (NCM211), $LiNi_{0.6}Co_{0.2}Mn_{0.2}O_2$ (NCM622), $LiNi_{0.8}Co0.1Mn_{0.1}O_2$ (NCM811)), lithium nickel cobalt aluminum oxide (for example, $LiNi_{0.85}Co_{0.15}Al_{0.05}O_2$), and modified compounds thereof. For example, the olivine-structure lithium-containing phosphate may include but is not limited to one or more of lithium iron phosphate ($LiFePO_4$ (LFP)), composite material of lithium iron phosphate and carbon, lithium manganese phosphate (for example, $LiMnPO_4$), composite material of lithium manganese phosphate and carbon, lithium manganese iron phosphate, and composite material of lithium manganese iron phosphate and carbon.

In some embodiments, the positive electrode film layer may further optionally include a binder. Non-limiting examples of the binder used for the positive electrode film layer may contain one or more of the following: polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin.

In some embodiments, the positive electrode film layer may further optionally contain a conductive agent. The conductive agent used for the positive electrode film layer may include one or more of superconducting carbon, acetylene black, carbon black, Ketjen black, carbon dots, carbon nanotubes, graphene, and carbon nanofibers.

In an embodiment of this application, the positive electrode may be prepared by using the following method: the foregoing components used for preparing a positive electrode, for example, the positive electrode active material, conductive agent, binder, and any other components, are dispersed in a solvent (for example, N-methylpyrrolidone) to form a uniform positive electrode slurry; the positive electrode slurry is applied on the positive electrode current collector, and then processes such as drying and cold pressing are performed to obtain the positive electrode plate.

<Negative Electrode Plate>

The cell of this application includes a negative electrode plate, where the negative electrode plate includes a negative electrode current collector and a negative electrode film layer provided on at least one surface of the negative electrode current collector, where the negative electrode film layer contains a negative electrode active material.

In an embodiment, the negative electrode active material in the negative electrode film layer may be a common negative electrode active material in the art, for example, one or more of natural graphite, artificial graphite, soft carbon, hard carbon, silicon-based material, tin-based material, and lithium titanate. The silicon-based material may be selected from one or more of elemental silicon, silicon oxide, and a silicon-carbon composite. The tin-based material may be selected from one or more of elemental tin, tin-oxygen compounds, and tin alloys.

In the cell of this application, in addition to the negative electrode active material, the negative electrode film layer may further include an optional binder, an optional conductive agent, and other optional auxiliary agents. The negative electrode film layer in this application is usually obtained through applying and drying a negative electrode slurry. The negative electrode slurry is usually obtained by dispersing the negative electrode active material and the optional conductive agent, binder, and others in a solvent and stirring them to a uniform mixture. The foregoing solvent may be N-methylpyrrolidone (NMP) or deionized water.

In an example, the conductive agent is one or more of superconducting carbon, carbon black (for example, acetylene black or Ketjen black), carbon dots, carbon nanotube, graphene, and carbon nanofiber.

In an example, the binder may include one or more of styrene-butadiene rubber (SBR), water soluble unsaturated resin SR-1B, polyacrylic acid (PAA), polyacrylic acid sodium (PAAS), polyacrylamide (PAM), polyvinyl alcohol (PVA), sodium alginate (SA), and carboxymethyl chitosan (CMCS). In an example, the binder may include one or one of styrene-butadiene rubber (SBR), polyvinyl alcohol (PVA), sodium alginate (SA), polymethacrylic acid (PMAA), and carboxymethyl chitosan (CMCS). The other optional auxiliary agents are, for example, a thickener (for example, sodium carboxymethyl cellulose CMC-Na) and a PTC thermistor material.

In addition, in the cell of this application, the negative electrode plate does not exclude additional functional layers other than the negative electrode film layer. For example, in some embodiments, the negative electrode plate of this application may further include a conductive primer layer (which is, for example, formed by a conductive agent and a binder) sandwiched between the negative electrode current collector and the first negative electrode film layer and disposed on the surface of the negative electrode current collector. In some other implementations, the negative electrode plate of this application may further include a protective layer covering a surface of a second negative electrode film layer.

In the cell of this application, the negative electrode current collector may be a metal foil or a composite current collector. For example, the metal foil may be copper foil, silver foil, iron foil, or foil made of alloys of the foregoing metals. The composite current collector may include a polymer matrix and a metal layer formed on at least one surface of the polymer matrix, and may be formed by forming a metal material (for example, aluminum, aluminum alloy, nickel, nickel alloy, titanium, titanium alloy, silver, and silver alloy) on the polymer matrix (for example, a matrix of polypropylene PP, polyethylene glycol terephthalate PET, polybutylene terephthalate PBT, polystyrene PS, polyethylene PE, or copolymers thereof).

<Electrolyte>

The electrolyte conducts ions between the positive electrode plate and the negative electrode plate, and plays a role of conducting ions. The electrolyte solution includes an electrolytic salt and a solvent. In some embodiments, the electrolytic salt may be one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bistrifluoromethanesulfonimide (LiTFSI), lithium trifluoromethanesulfonate (LiTFS), lithium difluoro(oxalato)borate (LiDFOB), lithium dioxalate borate (LiBOB), lithium difluorophosphate (LiPO2F2), lithium difluoro(dioxalato) phosphate (LiDFOP), and lithium tetrafluoro oxalato phosphate (LiTFOP).

In an embodiment of this application, the solvent may be selected from one or more of the following: ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methylmethyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), tetramethylene sulfone (SF), methyl sulfone (MSM), ethyl methyl sulfone (EMS), and diethyl sulfone (ESE).

In an embodiment of this application, assuming that a total weight of the electrolyte is used as a baseline, a solvent content accounts for 60-99 wt %, for example, 65-95% wt %, 70-90% wt %, 75-89 wt %, or 80-85 wt %. In an embodiment of this application, assuming that a total weight of the electrolyte is used as a baseline, an electrolyte content accounts for 1-40 wt %, for example, 5-35% wt %, 10-30% wt %, 11-25 wt %, or 15-20 wt %.

In an embodiment of this application, the electrolyte may further optionally include an additive. For example, the additive may include one or more of the following: a negative electrode film forming additive, a positive electrode film forming additive, or may include an additive capable of improving some performance of batteries, for example, an additive for improving over-charge performance of batteries, an additive for improving high-temperature performance of batteries, and an additive for improving low-temperature performance of batteries.

<Separator>

In an embodiment of this application, the cell further includes a separator, where the separator separates the positive electrode plate from the negative electrode plate, and provides selective transmission or barrier for substances of different types, sizes and charges in the system. For example, the separator may be an electronic insulator, which physically separates the positive electrode active substance from the negative electrode active substance of the cell, preventing internal short circuit and forming an electric field in a given direction, and which allows ions in the battery to move between the positive and negative electrodes through the separator.

In an embodiment of this application, a material used for preparing the separator may include one or more of glass fiber, non-woven fabric, polyethylene, polypropylene, and polyvinylidene fluoride. The separator may be a single-layer thin film or a multilayer composite thin film. When the separator is a multilayer composite thin film, each layer may be made of the same or different materials.

In an embodiment of this application, the foregoing positive electrode plate, negative electrode plate, and separator may be made into an electrode assembly/bare cell through winding or lamination.

In an embodiment of this application, the cell further includes an outer package. The outer package may be used for packaging the electrode assembly and the electrolyte. In some embodiments, the outer package of the cell may be a hard shell, for example, a hard plastic shell, an aluminum shell, or a steel shell. In some other embodiments, the outer package of the cell may alternatively be a soft pack, for example, a soft pouch. A material of the soft pack may be plastic, for example, one or more of polypropylene (PP), polybutylene terephthalate (PBT), polybutylene succinate (PBS), and the like.

Figure 2:
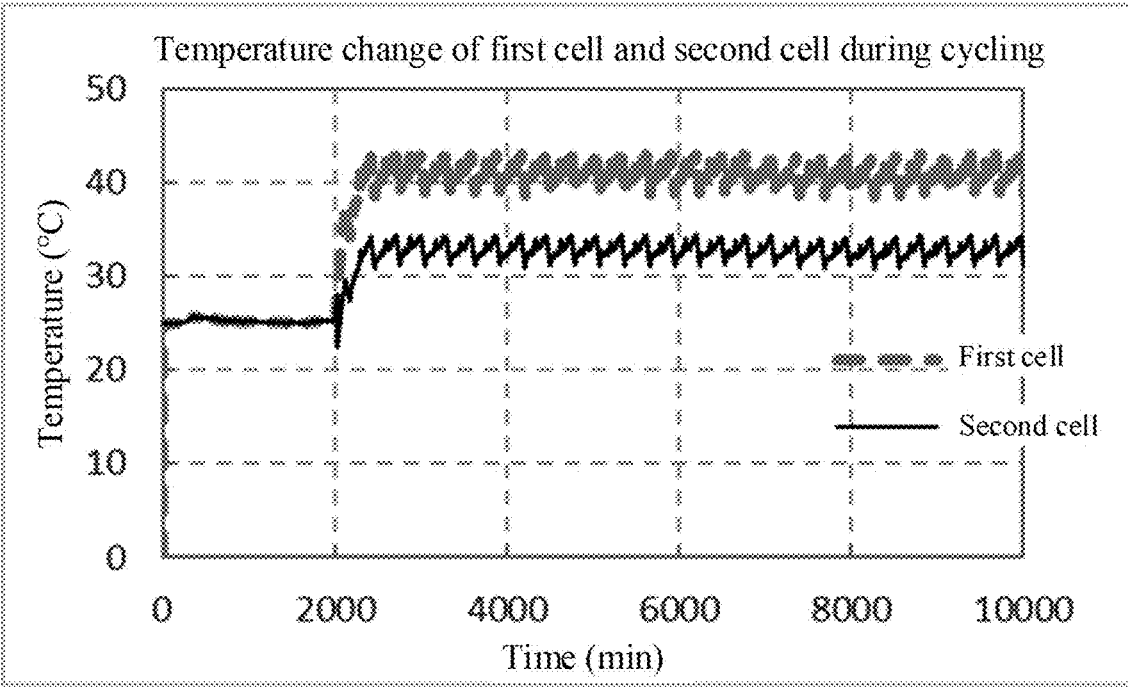
FIG. 2 is a schematic diagram of temperature rise of a ternary cell during cycling.

FIG. 1 is a schematic diagram of an example of a cell 5 according to this application. FIG. 2 is an exploded view of the example of the cell 5 in FIG. 1 according to this application.

The outer package may include a housing 51 and a cover plate 53. The housing 51 may include a base plate and side plates connected to the base plate, and the base plate and the side plates enclose an accommodating cavity. The housing 51 has an opening communicating with the accommodating cavity, and the cover plate 53 can cover the opening to close the accommodating cavity. A positive electrode plate, a negative electrode plate, and a separator may be made into an electrode assembly 52 through winding or lamination. The electrode assembly is packaged in the accommodating cavity, and the electrolyte infiltrates the electrode assembly 52. The cell 5 may include one or more electrode assemblies 52.

Battery Pack

In some embodiments, the foregoing battery module may be assembled into a battery pack, and the battery pack may include one or more battery modules. One or more battery modules form a battery pack. A specific quantity may be chosen by persons skilled in the art based on use and capacity of the battery pack.

Figure 7:
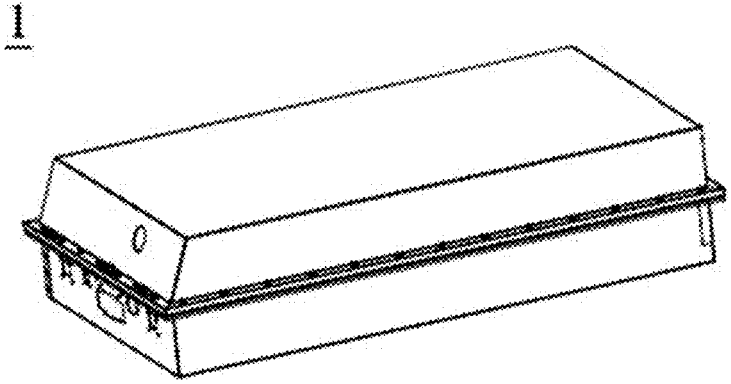
FIG. 7 is a schematic diagram of a battery pack according to an embodiment of this application.
Figure 8:
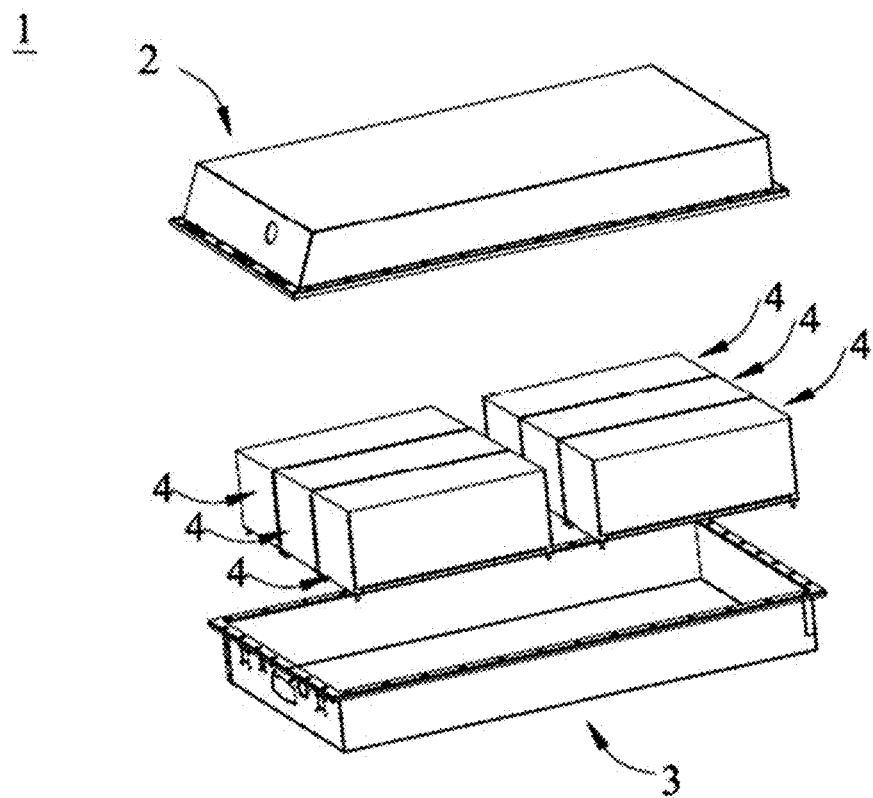
FIG. 8 is an exploded view of the battery pack according to the embodiment of this application in FIG. 7.

FIG. 7 and FIG. 8 show a battery pack 1 as an example. Referring to FIG. 7 and FIG. 8, the battery pack 1 may include a battery box and a plurality of battery modules 4 arranged in the battery box. The battery box includes an upper box body 2 and a lower box body 3. The upper box body 2 can cover the lower box body 3 to form an enclosed space for accommodating the battery modules 4. The plurality of battery modules 4 may be arranged in the battery box in any manner.

Electric Apparatus

In addition, this application further provides an electric apparatus. The electric apparatus includes at least one of the secondary battery, the battery module, or the battery pack provided in this application. The secondary battery, the battery module, or the battery pack may be used as a power source for the electric apparatus, or an energy storage unit of the electric apparatus. The electric apparatus may include a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite system, an energy storage system, and the like, but is not limited thereto.

For the electric apparatus, a secondary battery, a battery module, or a battery pack may be selected according to requirements for using the electric apparatus.

Figure 9:
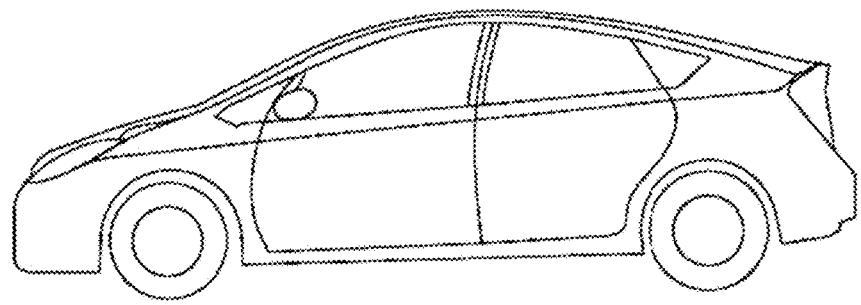
FIG. 9 is a schematic diagram of an electric apparatus using a secondary battery as a power source according to an embodiment of this application.

FIG. 9 shows an electric apparatus as an example. The electric apparatus is a battery electric vehicle, a hybrid electric vehicle, a plug-in hybrid electric vehicle, or the like. To meet a requirement of the electric apparatus for high power and high energy density of the secondary battery, a battery pack or a battery module may be used.

In another example, the apparatus may be a mobile phone, a tablet computer, a notebook computer, or the like. The apparatus usually requires to be light and thin, and a secondary battery may be used as a power source.

EXAMPLES

The following describes examples in this application. The examples described below are exemplary and only used to explain this application, but cannot be understood as a limitation of this application. Examples whose technical solutions or conditions are not specified are made based on technical solutions or conditions described in documents in the art, or made based on the product specification. The reagents or instruments used are all conventional products that can be purchased on the market if no manufacturer is indicated.

First cell I-1

Preparation of Positive Electrode Plate

A positive electrode active substance $LiNi_{0.55}Co_{0.05}Mn_{0.4}O_2$, a binder polyvinylidene fluoride, and a conductive agent acetylene black were mixed at a weight ratio of 98:1:1, N-methylpyrrolidone (NMP) was added, and the resulting mixture was stirred by using a vacuum mixer the system became uniformly black, to obtain a positive electrode slurry; the positive electrode slurry was evenly applied on aluminum foil of a thickness of 12 μm; and the aluminum foil coated with the slurry was transferred to a 100° C. tunnel oven to dry the slurry, followed by cold pressing, die cutting, and slitting to obtain a positive electrode plate.

Preparation of Negative Electrode Plate

Artificial graphite (BET of the artificial graphite was 0.8 $m^2/g$), a conductive agent carbon black, a binder acrylate were mixed at a mass ratio 92:2:6, deionized water was added, and the mixture was stirred by using a vacuum mixer to obtain a negative electrode slurry; the negative electrode slurry was uniformly applied on a copper foil negative current collector with a thickness of 6 μm; and the copper foil coated with the slurry was transferred to a 100° C. tunnel oven to dry the slurry, followed by cold pressing, die cutting, and slitting to obtain a negative electrode plate.

Preparation of Separator

A 7 μm-thick polyethylene film was used as a separator substrate; an inorganic oxide layer slurry was applied on one face of the 7 μm-thick separator substrate (polyethylene) by using a gravure coating method to control a slurry amount, where the inorganic oxide layer slurry was made of inorganic aluminum oxide powder, polyvinylpyrrolidone, and a solvent acetone that were mixed at a mass ratio of 3:1:6; and the separator substrate was dried in an oven to obtain a separator with a first coating layer. Polyvinylidene fluoride (PVDF), a solvent acetone, and ethyl acetate were stirred and mixed uniformly at a mass ratio of 5:40:55 to form a slurry, then the slurry was sprayed onto the prepared separator with the first coating layer, where a single-sided thickness of a second coating layer was 1 μm, and the separator substrate was dried in an oven, so that the second coating layer was formed on the first coating layer to finally obtain a separator. A porosity of the separator was 36%.

The positive electrode plate, the separator, and the negative electrode plate were stacked in order, so that the separator was placed between the positive and negative electrode plates for isolation, and the stack was wound and placed in a housing to obtain a first cell, where a thermal conductivity coefficient of the housing was 240 W/(m·k). $\Delta R_A$ of the obtained first cell was 0.17 Ω/100 cycles, $IMP_A$ was 0.32 mΩ, and $Cap_A$ was 195 Ah.

First Cell I-2

A preparation process of the first cell I-2 basically followed that of the first cell I-1 except that BET of artificial graphite was 1.0 m²/g.

First Cell I-3

A preparation process of the first cell I-3 basically followed that of the first cell I-1 except that BET of artificial graphite was 1.2 m²/g.

First Cell I-4

A preparation process of the first cell I-4 basically followed that of the first cell I-1 except that BET of artificial graphite was 2.0 m²/g.

Example I-5

A preparation process of the first cell I-5 basically followed that of the first cell I-3 except that obtained $\Delta R_A$ of the first cell I-5 was 0.10 Ω/100 cycles.

First Cell I-6

A preparation process of the first cell I-6 basically followed that of the first cell I-3 except that obtained $\Delta R_A$ of the first cell I-6 was 0.13 Ω/100 cycles.

First Cell I-7

A preparation process of the first cell I-7 basically followed that of the first cell I-3 except that obtained $\Delta R_A$ of the first cell I-7 was 0.17 Ω/100 cycles.

First Cell I-8

A preparation process of the first cell I-8 basically followed that of the first cell I-3 except that obtained $\Delta R_A$ of the first cell I-8 was 0.20 Ω/100 cycles.

First Cell I-9

A preparation process of the first cell I-9 basically followed that of the first cell I-3 except that obtained $\Delta R_A$ of the first cell I-9 was 0.33 Ω/100 cycles.

First Cell I-10

A preparation process of the first cell I-10 basically followed that of the first cell I-3 except that obtained $\Delta R_A$ of the first cell I-10 was 0.40 Ω/100 cycles.

First Cell I-11

A preparation process of the first cell I-11 basically followed that of the first cell I-3 except that a porosity of the separator of the first cell I-11 was 40%.

First Cell I-12

A preparation process of the first cell I-12 basically followed that of the first cell I-3 except that a porosity of the separator of the first cell I-12 was 50%.

First Cell I-13

A preparation process of the first cell I-13 basically followed that of the first cell I-3 except that a porosity of the separator of the first cell I-13 was 60%.

First Cell I-14

A preparation process of the first cell I-14 basically followed that of the first cell I-3 except that obtained $IMP_A$ of the first cell I-14 was 0.08 mΩ.

First Cell I-15

A preparation process of the first cell I-15 basically followed that of the first cell I-3 except that obtained $IMP_A$ of the first cell I-15 was 0.1 mΩ.

First Cell I-16

A preparation process of the first cell I-16 basically followed that of the first cell I-3 except that obtained $IMP_A$ of the first cell I-16 was 0.45 mΩ.

First Cell I-17

A preparation process of the first cell I-17 basically followed that of the first cell I-3 except that obtained $IMP_A$ of the first cell I-17 was 2 mΩ.

First Cell I-18

A preparation process of the first cell I-18 basically followed that of the first cell I-3 except that obtained $IMP_A$ of the first cell I-18 was 1.2 mΩ.

First Cell I-19

A preparation process of the first cell I-19 basically followed that of the first cell I-3 except that obtained $Cap_A$ of the first cell I-19 was 90 Ah.

First Cell I-20

A preparation process of the first cell I-20 basically followed that of the first cell I-3 except that obtained $Cap_A$ of the first cell I-20 was 140 Ah.

First Cell I-21

A preparation process of the first cell I-21 basically followed that of the first cell I-3 except that obtained $Cap_A$ of the first cell I-21 was 260 Ah.

First Cell I-22

A preparation process of the first cell I-22 basically followed that of the first cell I-3 except that obtained $Cap_A$ of the first cell I-22 was 280 Ah.

First Cell I-23

A preparation process of the first cell I-23 basically followed that of the first cell I-3 except that obtained $Cap_A$ of the first cell I-23 was 300 Ah.

Related parameters for the first cells I-1 to I-23 are shown in Table 1 below.

TABLE 1

Parameters for first cells I-1 to I-23 as tested

| No. | Positive electrode active substance | Negative electrode active substance | Artificial graphite BET ($m^2/g$) | $\Delta R_A$ m$\Omega$/100 cycles | Separator porosity (%) | $IMP_A$ (m$\Omega$) | $Cap_A$ (Ah) |
|---|---|---|---|---|---|---|---|
| I-1 | $LiNi_{0.55}Co_{0.05}Mn_{0.4}O_2$ | Artificial graphite | 0.8 | 0.17 | 36 | 0.32 | 195 |
| I-2 | $LiNi_{0.55}Co_{0.05}Mn_{0.4}O_2$ | Artificial graphite | 1 | 0.17 | 36 | 0.32 | 195 |
| I-3 | $LiNi_{0.55}Co_{0.05}Mn_{0.4}O_2$ | Artificial graphite | 1.2 | 0.17 | 36 | 0.32 | 195 |
| I-4 | $LiNi_{0.55}Co_{0.05}Mn_{0.4}O_2$ | Artificial graphite | 2 | 0.17 | 36 | 0.32 | 195 |
| I-5 | $LiNi_{0.55}Co_{0.05}Mn_{0.4}O_2$ | Artificial graphite | 1.2 | 0.1 | 36 | 0.32 | 195 |
| I-6 | $LiNi_{0.55}Co_{0.05}Mn_{0.4}O_2$ | Artificial graphite | 1.2 | 0.13 | 36 | 0.32 | 195 |
| I-7 | $LiNi_{0.55}Co_{0.05}Mn_{0.4}O_2$ | Artificial graphite | 1.2 | 0.17 | 36 | 0.32 | 195 |
| I-8 | $LiNi_{0.55}Co_{0.05}Mn_{0.4}O_2$ | Artificial graphite | 1.2 | 0.2 | 36 | 0.32 | 195 |
| I-9 | $LiNi_{0.55}Co_{0.05}Mn_{0.4}O_2$ | Artificial graphite | 1.2 | 0.33 | 36 | 0.32 | 195 |
| I-10 | $LiNi_{0.55}Co_{0.05}Mn_{0.4}O_2$ | Artificial graphite | 1.2 | 0.4 | 36 | 0.32 | 195 |
| I-11 | $LiNi_{0.55}Co_{0.05}Mn_{0.4}O_2$ | Artificial graphite | 1.2 | 0.17 | 40 | 0.32 | 195 |
| I-12 | $LiNi_{0.55}Co_{0.05}Mn_{0.4}O_2$ | Artificial graphite | 1.2 | 0.17 | 50 | 0.32 | 195 |
| I-13 | $LiNi_{0.55}Co_{0.05}Mn_{0.4}O_2$ | Artificial graphite | 1.2 | 0.17 | 60 | 0.32 | 195 |
| I-14 | $LiNi_{0.55}Co_{0.05}Mn_{0.4}O_2$ | Artificial graphite | 1.2 | 0.17 | 36 | 0.08 | 195 |
| I-15 | $LiNi_{0.55}Co_{0.05}Mn_{0.4}O_2$ | Artificial graphite | 1.2 | 0.17 | 36 | 0.1 | 195 |
| I-16 | $LiNi_{0.55}Co_{0.05}Mn_{0.4}O_2$ | Artificial graphite | 1.2 | 0.17 | 36 | 0.45 | 195 |
| I-17 | $LiNi_{0.55}Co_{0.05}Mn_{0.4}O_2$ | Artificial graphite | 1.2 | 0.17 | 36 | 2 | 195 |
| I-18 | $LiNi_{0.55}Co_{0.05}Mn_{0.4}O_2$ | Artificial graphite | 1.2 | 0.17 | 36 | 1.2 | 195 |
| I-19 | $LiNi_{0.55}Co_{0.05}Mn_{0.4}O_2$ | Artificial graphite | 1.2 | 0.17 | 36 | 0.32 | 90 |
| I-20 | $LiNi_{0.55}Co_{0.05}Mn_{0.4}O_2$ | Artificial graphite | 1.2 | 0.17 | 36 | 0.32 | 140 |
| I-21 | $LiNi_{0.55}Co_{0.05}Mn_{0.4}O_2$ | Artificial graphite | 1.2 | 0.17 | 36 | 0.32 | 260 |
| I-22 | $LiNi_{0.55}Co_{0.05}Mn_{0.4}O_2$ | Artificial graphite | 1.2 | 0.17 | 36 | 0.32 | 280 |
| I-23 | $LiNi_{0.55}Co_{0.05}Mn_{0.4}O_2$ | Artificial graphite | 1.2 | 0.17 | 36 | 0.32 | 300 |

Second Cell II-1

A preparation process of the second cell II-1 basically followed that of the first cell I-1 except that LFP was used as a positive electrode active substance and thermal conductivity coefficient of a housing of the cell was 220 W/(m·k). Obtained $\Delta R_B$ of the second cell was 0.02 $\Omega$/100 cycles, $IMP_B$ was 0.18 m$\Omega$, and $Cap_B$ was 156 Ah.

Second Cell II-2

A preparation process of the second cell II-2 basically followed that of the second cell II-1 except that BET of artificial graphite was 1.0 $m^2/g$.

Second Cell II-3

A preparation process of the second cell II-3 basically followed that of the second cell II-1 except that BET of artificial graphite was 1.2 $m^2/g$.

Second cell II-4

A preparation process of the second cell II-4 basically followed that of the second cell II-1 except that BET of artificial graphite was 2.0 $m^2/g$.

Example II-5

A preparation process of the second cell II-5 basically followed that of the second cell II-3 except that obtained $\Delta R_B$ of the second cell II-5 was 0.03 $\Omega$/100 cycles.

Second Cell II-6

A preparation process of the second cell II-6 basically followed that of the second cell II-3 except that obtained $\Delta R_B$ of the second cell II-6 was 0.05 $\Omega$/100 cycles.

Second cell II-7

A preparation process of the second cell II-7 basically followed that of the second cell II-3 except that obtained $\Delta R_B$ of the second cell II-7 was 0.21 $\Omega$/100 cycles.

Second Cell II-8

A preparation process of the second cell II-8 basically followed that of the second cell II-3 except that obtained $\Delta R_B$ of the second cell II-8 was 0.32 $\Omega$/100 cycles.

Second Cell II-9

A preparation process of the second cell II-9 basically followed that of the second cell II-3 except that obtained $\Delta R_B$ of the second cell II-9 was 0.35 $\Omega$/100 cycles.

Second Cell II-10

A preparation process of the second cell II-10 basically followed that of the second cell II-3 except that a porosity of the separator of the second cell II-10 was 40%.

Second Cell II-11

A preparation process of the second cell II-11 basically followed that of the second cell II-3 except that a porosity of the separator of the second cell II-11 was 50%.

Second Cell II-12

A preparation process of the second cell II-12 basically followed that of the second cell II-3 except that a porosity of the separator of the second cell II-12 was 60%.

Second Cell II-13

A preparation process of the second cell II-13 basically followed that of the second cell II-3 except that obtained $IMP_B$ of the second cell II-13 was 0.05 mΩ.

Second Cell II-14

A preparation process of the second cell II-14 basically followed that of the second cell II-3 except that obtained $IMP_B$ of the second cell II-14 was 0.09 mΩ.

Second Cell II-15

A preparation process of the second cell II-15 basically followed that of the second cell II-3 except that obtained $IMP_B$ of the second cell II-15 was 0.36 mΩ.

Second Cell II-16

A preparation process of the second cell II-16 basically followed that of the second cell II-3 except that obtained $IMP_B$ of the second cell II-16 was 1 mΩ.

Second Cell II-17

A preparation process of the second cell II-17 basically followed that of the second cell II-3 except that obtained $IMP_B$ of the second cell II-17 was 1.5 mΩ.

Second Cell II-18

A preparation process of the second cell II-18 basically followed that of the second cell II-3 except that obtained $Cap_B$ of the second cell II-18 was 90 Ah.

Second Cell II-19

A preparation process of the second cell II-19 basically followed that of the second cell II-3 except that obtained $Cap_B$ of the second cell II-19 was 158 Ah.

Second Cell II-20

A preparation process of the second cell II-20 basically followed that of the second cell II-3 except that obtained $Cap_B$ of the second cell II-20 was 168 Ah.

Second Cell II-21

A preparation process of the second cell II-21 basically followed that of the second cell II-3 except that obtained $Cap_B$ of the second cell II-21 was 200 Ah.

Second Cell II-22

A preparation process of the second cell II-22 basically followed that of the second cell II-3 except that obtained $Cap_B$ of the second cell II-22 was 224 Ah.

Second Cell II-23

A preparation process of the second cell II-23 basically followed that of the second cell II-3 except that obtained $Cap_B$ of the second cell II-23 was 230 Ah.

Second Cell II-24

A preparation process of the second cell II-24 basically followed that of the second cell II-3 except that NaMPO was used as a positive electrode material and obtained $Cap_B$ of the second cell II-24 was 177 Ah.

Related parameters for the second cells II-1 to I-24 are shown in Table 2 below.

TABLE 2

Parameters for second cells II-1 to II-24

| No. | Positive electrode active substance | Negative electrode active substance | Artificial graphite BET ($m^2/g$) | $\Delta R_B$ (mΩ/100 cycles) | Porosity of separator (%) | $IMP_B$ (mΩ) | $Cap_B$ (Ah) |
|---|---|---|---|---|---|---|---|
| II-1 | LFP | Artificial graphite | 0.8 | 0.02 | 36 | 0.18 | 156 |
| II-2 | LFP | Artificial graphite | 1 | 0.02 | 36 | 0.18 | 156 |
| II-3 | LFP | Artificial graphite | 1.2 | 0.02 | 36 | 0.18 | 156 |
| II-4 | LFP | Artificial graphite | 2 | 0.02 | 36 | 0.18 | 156 |
| II-5 | LFP | Artificial graphite | 1.2 | 0.03 | 36 | 0.18 | 156 |
| II-6 | LFP | Artificial graphite | 1.2 | 0.05 | 36 | 0.18 | 156 |
| II-7 | LFP | Artificial graphite | 1.2 | 0.21 | 36 | 0.18 | 156 |
| II-8 | LFP | Artificial graphite | 1.2 | 0.32 | 36 | 0.18 | 156 |
| II-9 | LFP | Artificial graphite | 1.2 | 0.35 | 36 | 0.18 | 156 |
| II-10 | LFP | Artificial graphite | 1.2 | 0.02 | 40 | 0.18 | 156 |
| II-11 | LFP | Artificial graphite | 1.2 | 0.02 | 50 | 0.18 | 156 |
| II-12 | LFP | Artificial graphite | 1.2 | 0.02 | 60 | 0.18 | 156 |
| II-13 | LFP | Artificial graphite | 1.2 | 0.02 | 36 | 0.05 | 156 |
| II-14 | LFP | Artificial graphite | 1.2 | 0.02 | 36 | 0.09 | 156 |
| II-15 | LFP | Artificial graphite | 1.2 | 0.02 | 36 | 0.36 | 156 |
| II-16 | LFP | Artificial graphite | 1.2 | 0.02 | 36 | 1 | 156 |

TABLE 2-continued

Parameters for second cells II-1 to II-24

| No. | Positive electrode active substance | Negative electrode active substance | Artificial graphite BET ($m^2/g$) | $\Delta R_B$ (m$\Omega$/100 cycles) | Porosity of separator (%) | $IMP_B$ (m$\Omega$) | $Cap_B$ (Ah) |
|---|---|---|---|---|---|---|---|
| II-17 | LFP | Artificial graphite | 1.2 | 0.02 | 36 | 1.5 | 156 |
| II-18 | LFP | Artificial graphite | 1.2 | 0.02 | 36 | 0.18 | 90 |
| II-19 | LFP | Artificial graphite | 1.2 | 0.02 | 36 | 0.18 | 158 |
| II-20 | LFP | Artificial graphite | 1.2 | 0.02 | 36 | 0.18 | 168 |
| II-21 | LFP | Artificial graphite | 1.2 | 0.02 | 36 | 0.18 | 200 |
| II-22 | LFP | Artificial graphite | 1.2 | 0.02 | 36 | 0.18 | 224 |
| II-23 | LFP | Artificial graphite | 1.2 | 0.02 | 36 | 0.18 | 230 |
| II-24 | NaMPO | Artificial graphite | 1.2 | 0.03 | 36 | 0.18 | 177 |

Methods for Testing Parameters in Tables 1 and 2 are as Follows:

(1) Method for Testing Discharge Resistance Change Rate ($\Delta R_A$ or $\Delta R_B$) of Battery During Cycling A battery was fully charged to an upper limit V1 of a design voltage of the battery at a constant current and a constant voltage at 25° C., and then was discharged for 10 seconds (T) at a discharge rate of 4 C. In this case, a voltage was V2, a discharge resistance R was equal to (V1-V2)/I, a discharge resistance growth rate $\Delta R$ was a difference $\Delta R = R100 - R1$ between discharge resistances of the battery every 100 cycles of charging and discharging, and measured in m$\varphi$/100 cycles.

(2) Method for Testing Alternating Current Impedance of Battery

An HIOKI BT3562 battery tester made in Japan was used as a test instrument.

Main content in standard test of IMP:
(a) A battery was charged to a specified voltage value at a constant current of 0.2 C/h.
(b) The battery was stored for 1 to 4 hours.
(c) The alternating current-voltage method was adopted for test: An alternating current Ia was allowed to pass through the battery, and then voltage drops Ua between two ends of the battery were measured.
(d) A test signal had a frequency of 1 KHz±0.1 KHz and was a sine wave.
(e) A test current was 50 mA, or when an alternating current signal passed through the battery, voltage drops between two ends of the battery did not exceed 20 mV.
(f) The foregoing steps were completed at 25° C.±5° C.

(3) Method for Testing Cell Capacity (Actual Capacity and Nominal Capacity)

Within upper and lower limits of a rated voltage specified for a battery cell, the battery cell was charged to the upper voltage limit at a constant current of 0.33 C and a constant voltage at 25° C., and then discharged to the lower voltage limit at 0.33 C, where an amount of electricity discharged (Ah) was a capacity of the battery cell. In this application, an actual capacity of a battery cell refers to an amount of electricity that is actually discharged by the battery cell under a specified condition (for example, 0.2 C). Amounts of electricity discharged by the battery cell under different discharge systems differ with each other. An actual capacity of the battery cell under an unspecified discharge system is usually represented by a nominal capacity. The nominal capacity is an approximate representation of an actual capacity. Discharge current intensity, temperature, and discharge cut-off voltage of the battery cell are referred to as a discharge system of the battery cell.

The first cells and the second cells were connected in series based on parameters in Table 3 below to make a battery module.

Example 1

9 first cells I-5 and 9 second cells II-9 were connected in series and arranged alternately in a single row to prepare a battery module.

Example 2

9 first cells I-6 and 9 second cells II-8 were connected in series and arranged alternately in a single row to prepare a battery module.

Example 3

9 first cells I-8 and 9 second cells II-7 were connected in series and arranged alternately in a single row to prepare a battery module.

Example 4

9 first cells I-8 and 9 second cells II-6 were connected in series and arranged alternately in a single row to prepare a battery module.

Example 5

9 first cells I-9 and 9 second cells II-5 were connected in series and arranged alternately in a single row to prepare a battery module.

Example 6

9 first cells I-10 and 9 second cells II-21 were connected in series and arranged alternately in a single row to prepare a battery module.

Example 7

9 first cells I-21 and 9 second cells II-23 were connected in series and arranged alternately in a single row to prepare a battery module.

Example 8

9 first cells I-21 and 9 second cells II—were connected in series and arranged alternately in a single row to prepare a battery module.

Example 9

9 first cells I-5 and 9 second cells II-9 were connected in series and arranged alternately in a single row to prepare a battery module.

Example 10

9 first cells I-19 and 9 second cells II-18 were connected in series and arranged alternately in a single row to prepare a battery module.

Example 11

9 first cells I-23 and 9 second cells II-19 were connected in series and arranged alternately in a single row to prepare a battery module.

Example 12

9 first cells I-7 and 9 second cells II-24 were connected in series and arranged alternately in a single row to prepare a battery module.

Example 13

9 first cells I-15 and 9 second cells II-13 were connected in series and arranged alternately in a single row to prepare a battery module.

Example 14

9 first cells I-18 and 9 second cells II-16 were connected in series and arranged alternately in a single row to prepare a battery module.

Example 15

9 first cells I-16 and 9 second cells II-17 were connected in series and arranged alternately in a single row to prepare a battery module.

Example 16

10 first cells I-7 were connected in series with 10 second cells II-6 at two layers (with planes formed, 2*2) to prepare a battery module, with the first cells all at a lower layer and the second cells all at an upper layer.

Example 17

12 first cells I-7 were connected in series with 12 second cells II-6 at two layers (with planes formed, 2*2) to prepare a battery module, with more first cells at a lower layer than at an upper layer. Specifically, 10 first cells and 2 second cells were provided at the lower layer, and 2 first cells and 10 second cells were provided at the upper layer.

Example 18

12 first cells I-7 were connected in series with 6 second cells II-6 in a single row to prepare a battery module, with more first cells than second cells at two ends of the row. Specifically, the first cells and the second cells were arranged alternately starting from the middle with one following the other, and remaining first cells were distributed at two ends.

Example 19

6 first cells I-7 were connected in series with 12 second cells II-6 in a single row to prepare a battery module, with fewer first cells than second cells at two ends of the row. Specifically, second cells are distributed at two ends of the row, and second cells and the first cells were arranged alternately starting from the middle.

Comparative Example 1

A preparation process of Comparative Example 1 basically followed that of Example 12 except that 18 first cells I-7 were used and no second cells are used.

Comparative Example 2

A preparation process of Comparative Example 2 basically followed that of Example 4 except that 18 second cells II-6 were used and no first cells are used.

Comparative Example 3

A preparation process of Comparative Example 3 basically followed that of Example 11 except that 9 first cells I-23 were used and 9 second cells II-18 are used.

Comparative Example 4

A preparation process of Comparative Example 4 basically followed that of Example 10 except that 9 first cells I-18 were used and 9 second cells II-13 are used.

Related parameters for Examples 1 to 19 and Comparative Examples 1 to 4 are shown in Table 3.

TABLE 3

Parameters designed for battery module in Examples 1 to 19 and Comparative Examples 1 to 4

| Example number | First cell number | Quantity of first cells n | Second cell number | Quantity of second cells m | $\Delta R_B/\Delta R_A$ | Arrangement manner of first cells and second cells in battery module | $Cap_A/Cap_B$ | $IMP_A/IMP_B$ |
|---|---|---|---|---|---|---|---|---|
| Example 1 | I-5 | 9 | II-9 | 9 | 3.50 | Alternately arranged in a single row | 1.25 | 1.78 |

TABLE 3-continued

Parameters designed for battery module in Examples 1 to 19 and Comparative Examples 1 to 4

| Example number | First cell number | Quantity of first cells n | Second cell number | Quantity of second cells m | $\Delta R_B/\Delta R_A$ | Arrangement manner of first cells and second cells in battery module | $Cap_A/Cap_B$ | $IMP_A/IMP_B$ |
|---|---|---|---|---|---|---|---|---|
| Example 2 | I-6 | 9 | II-8 | 9 | 2.46 | Alternately arranged in a single row | 1.25 | 1.78 |
| Example 3 | I-8 | 9 | II-7 | 9 | 1.05 | Alternately arranged in a single row | 1.25 | 1.78 |
| Example 4 | I-8 | 9 | II-6 | 9 | 0.25 | Alternately arranged in a single row | 1.25 | 1.78 |
| Example 5 | I-9 | 9 | II-5 | 9 | 0.09 | Alternately arranged in a single row | 1.25 | 1.78 |
| Example 6 | I-10 | 9 | II-5 | 9 | 0.08 | Alternately arranged in a single row | 1.25 | 1.78 |
| Example 7 | I-21 | 9 | II-23 | 9 | 0.12 | Alternately arranged in a single row | 1.13 | 1.78 |
| Example 8 | I-21 | 9 | II-21 | 9 | 0.12 | Alternately arranged in a single row | 1.30 | 1.78 |
| Example 9 | I-22 | 9 | II-19 | 9 | 0.12 | Alternately arranged in a single row | 1.77 | 1.78 |
| Example 10 | I-19 | 9 | II-18 | 9 | 0.12 | Alternately arranged in a single row | 1.00 | 1.78 |
| Example 11 | I-23 | 9 | II-19 | 9 | 0.12 | Alternately arranged in a single row | 1.90 | 1.78 |
| Example 12 | I-7 | 9 | II-24 | 9 | 0.18 | Alternately arranged in a single row | 1.10 | 1.78 |
| Example 13 | I-15 | 9 | II-13 | 9 | 0.12 | Alternately arranged in a single row | 1.25 | 2.00 |
| Example 14 | I-18 | 9 | II-16 | 9 | 0.12 | Alternately arranged in a single row | 1.25 | 1.20 |
| Example 15 | I-15 | 9 | II-14 | 9 | 0.12 | Alternately arranged in a single row | 1.25 | 1.11 |
| Example 16 | I-7 | 10 | II-6 | 10 | 0.29 | Arranged in two layers (with planes formed, 2*2), the first cells all at a lower layer and the second cells all at an upper layer | 1.25 | 1.78 |
| Example 17 | I-7 | 12 | II-6 | 12 | 0.29 | Arranged in two layers (with planes formed, 2*2), with more first cells at a lower layer than an upper layer | 1.25 | 1.78 |
| Example 18 | I-7 | 12 | II-6 | 6 | 0.29 | Arranged in a single row, with n > m | 1.25 | 1.78 |
| Example 19 | I-7 | 6 | II-6 | 12 | 0.29 | Arranged in a single row, with n < m | 1.25 | 1.78 |
| Comparative Example 1 | I-7 | 18 | / | 0 | 0.17 | Using all first cells | / | / |
| Comparative Example 2 | / | 0 | II-6 | 18 | 0.02 | Using all second cells | / | / |
| Comparative Example 3 | I-23 | 9 | II-18 | 9 | 0.12 | Alternately arranged in a single row | 3.33 | 1.78 |

TABLE 3-continued

Parameters designed for battery module in Examples 1 to 19 and Comparative Examples 1 to 4

| Example number | First cell number | Quantity of first cells n | Second cell number | Quantity of second cells m | $\Delta R_B/\Delta R_A$ | Arrangement manner of first cells and second cells in battery module | $Cap_A/Cap_B$ | $IMP_A/IMP_B$ |
|---|---|---|---|---|---|---|---|---|
| Comparative Example 4 | I-18 | 9 | II-13 | 9 | 0.12 | Alternately arranged in a single row | 1.25 | 24.00 |

In addition, electric performance test was performed separately on the battery modules obtained in Examples 1 to 19 and Comparative Examples 1 to 4.

1. Change of Capacity and Power of Battery Pack at Constant Temperature

A test condition was set at −20° C., 1 C/1 C charge and discharge cycling was performed, and a temperature sensor was in close contact with a middle position of a largest side of a cell. After battery packs had completed 100 cycles, the battery packs were tested for power performance.

2. Method for Testing Capacity Retention Rate of Battery Module at Low Temperature (1) Modules were placed in a 25° C. thermostat and left to stand for 12 h, discharged to a cut-off voltage of the module at 0.33 C and left to stand for 60 min, charged to a full charge cut-off voltage of the module at 0.33 C and left to stand for 60 min, and discharged to a lower limit cut-off voltage of the module at 0.33 C, and discharge capacities at this time were recorded as C1s.

(2) The modules were placed in a low-temperature thermostat (−20° C.) and left to stand for 12 h, discharged to a cut-off voltage of the module at 0.33 C and left to stand for 60 min, charged to a full charge cut-off voltage of the module at 0.33 C and left to stand for 60 min, and discharged to a lower limit cut-off voltage of the module at 0.33 C, and discharge capacities at this time were recorded as C2s.

(3) Low-temperature capacity retention rate=C2/C1× 100%

The test results are shown in table 4 below.

TABLE 4

Electric performance test results of Examples 1 to 19 and Comparative Examples 1 to 4

| Example number | Power of battery module (unit: KW) | Low-temperature capacity retention rate of battery module |
|---|---|---|
| Example 1 | 21.89 | 87.9% |
| Example 2 | 22.11 | 88.8% |
| Example 3 | 22.34 | 91.6% |
| Example 4 | 21.78 | 87.0% |
| Example 5 | 21.76 | 86.6% |
| Example 6 | 21.00 | 92.65% |
| Example 7 | 22.36 | 91.65% |
| Example 8 | 22.35 | 92.34% |
| Example 9 | 22.36 | 93.70% |
| Example 10 | 22.01 | 91.55% |
| Example 11 | 23.22 | 91.98% |
| Example 12 | 23.02 | 91.76% |
| Example 13 | 22.34 | 91.58% |
| Example 14 | 22.34 | 90.48% |
| Example 15 | 22.34 | 90.37% |
| Example 16 | 23.22 | 91.58% |
| Example 17 | 24.11 | 92.47% |
| Example 18 | 23.53 | 91.37% |
| Example 19 | 23.14 | 91.06% |
| Comparative Example 1 | 19.92 | 90.8% |
| Comparative Example 2 | 18.75 | 85.8% |
| Comparative Example 3 | 18.44 | 86.1% |
| Comparative Example 4 | 18.49 | 85.9% |

It can be learned from Table 3 that $\Delta R_B/\Delta R_A$ ratios were changed in Examples 1 to 6. It can be learned from data in Table 4 that when $0.08 \leq \Delta R_B/\Delta R_A \leq 3.5$, power and low-temperature capacity retention rates of battery modules were both good.

$Cap_A/Cap_B$ values were changed in Examples 6 to 12. It can be learned from data in Table 4 that when $1 \leq Cap_A/Cap_B \leq 1.9$, power and low-temperature capacity retention rates of battery modules were both good. Especially in Example 9, when first cells I-22 and second cells II-19 were arranged alternately in a single row, power of the battery module was as high as 22.36 KW, and a capacity retention rate at low temperature of the battery module was as high as 93.7%.

$IMP_A/IMP_B$ values were changed in Examples 13 to 15. When $1 \leq IMP_A/IMP_B \leq 2$, power and low-temperature capacity retention rates of battery modules were both good.

Arrangement manner of first cells and second cells in battery modules were changed in Examples 16 to 19. It can be learned from data in Table 4 that Examples 16 to 19 all produce good effects, with a significant increase in both power and low-temperature capacity retention rates of the battery modules.

By contrast, there was no effective increase in power and low-temperature capacity retention rates of battery modules in Comparative Examples 1 to 4.

It should be noted that this application is not limited to the foregoing examples. The foregoing embodiments are merely examples, and embodiments having constructions substantially the same as those of the technical idea and having the same effects as the technical idea within the scope of the technical solutions of this application are all included in the technical scope of this application. In addition, within the scope without departing from the essence of this application, various modifications that can be conceived by persons skilled in the art are applied to the embodiments, and other modes constructed by combining some of the constituent elements in the embodiments are also included in the scope of this application.

The invention claimed is:

1. A battery module, comprising a first type of cell and a second type of cell that are cells of different chemical systems, wherein
the first type of cell comprises n first cells, the second type of cell comprises m second cells, wherein n and m each are selected from an integer greater than 1, at least one of the first cells and at least one of the second cells are electrically connected in series, and the first cell and the second cell satisfy at least conditions (1) to (3):

$0.08 \leq \Delta R_B / \Delta R_A \leq 3.50;$   condition (1):

$0.10\ m\Omega/100\ cycles \leq \Delta R_A \leq 0.40\ m\Omega/100\ cycles;$ and   condition (2):

$IMP_B < IMP_A;$ and,   condition (3):

wherein $\Delta R_A$ is a discharge resistance growth rate of the first cell,
$\Delta R_B$ is a discharge resistance growth rate of the second cell,
$IMP_A$ is an alternating current impedance of the first cell; and
$IMP_B$ is an alternating current impedance of the second cell,
wherein the discharge resistance growth rate is measured by a difference between a discharge resistance (R) of a cell in an initial state and a discharge resistance of the cell after 100 cycles of charging/discharging, wherein the discharge resistance of the cell is calculated using formula R=(V1−V2)/I, wherein I is a constant discharge current, V1 is an initial voltage of the cell, V2 is an end voltage of the cell after discharging at I for a specified period of time, and $\Delta R_B/\Delta R_A$ are measured under the same condition, and
wherein the alternating current impedance is measured using a test signal with a frequency of 1000 Hz, and $IMP_A$ and $IMP_B$ are measured under the same condition.

2. The battery module according to claim 1, wherein at least part of the first cell and at least part of the second cell are in thermal contact.

3. The battery module according to claim 1, wherein the discharge resistance growth rate $\Delta R_B$ of the second cell further satisfies $0.03\ m\Omega/100\ cycles \leq \Delta R_B \leq 0.35\ m\Omega/100$ cycles.

4. The battery module according to claim 1, wherein the alternating current impedance $IMP_A$ of the first cell satisfies: $0.08\ m\Omega \leq IMP_A \leq 2\ m\Omega$.

5. The battery module according to claim 1, wherein the alternating current impedance $IMP_B$ of the second cell satisfies: $0.05\ m\Omega \leq IMP_B \leq 1.5\ m\Omega$.

6. The battery module according to claim 1, wherein the first cell and the second cell further satisfy $1 \leq Cap_A/Cap_B \leq 1.9$, wherein $Cap_A$ is a capacity of the first cell, $Cap_B$ is a capacity of the second cell.

7. The battery module according to claim 1, wherein the capacity $Cap_A$ of the first cell satisfies $90\ Ah \leq Cap_A \leq 300\ Ah$.

8. The battery module according to claim 1, wherein the capacity $Cap_B$ of the second cell satisfies $90\ Ah \leq Cap_B < 230\ Ah$.

9. The battery module according to claim 1, wherein a positive electrode active substance of the first cell comprises a lithium transition metal oxide represented by formula (I):

$Li_{1+x1}Ni_aCo_bM^1{}_{1-a-b}O_{2-y1}A^1{}_{y1}$   formula (I), wherein $-0.1 \leq x1 \leq 0.2$, $0.3 \leq a \leq 0.95$, $0 < b < 0.2$, $0 < a+b < 1$, $0 < y1 < 0.2$, $M^1$ is selected from one or more of Mn, Fe, Cr, Ti, Zn, V, Al, Zr, and Ce, and $A^1$ is selected from one or more of S, F, Cl, and I.

10. The battery module according to claim 1, wherein the positive electrode active substance of the second cell comprises at least one of lithium containing phosphate represented by formula (II), lithium manganese-based oxide represented by formula (III), compound represented by formula (IV), compound represented by formula (V), and compound represented by formula (VI):

$LiFe_{1-x2-y2}Mn_{x2}M^2{}_{y2}PO_4$   formula (II), $Li_{1+x3}Mn_eM^3{}_{2-e}O_{4-d}A^3{}_d$   formula (III), $Na_{x4}M^4[M^{4'}(CN)_6]_{y4}zH_2O$   formula (IV), $Na_2M^5{}_{x5}M^{5'}{}_{y5}(PO_4)A^5$   formula (V), and $Na_{x6}M^6{}_{y6}Ni_{z6}Fe_{d6}Mn_{e6}O_{2\pm\delta}$   formula (VI), wherein in formula (II), $0 \leq x2 \leq 1$, $0 \leq y2 \leq 0.1$, and $M^2$ is selected from at least one of transition metal elements other than Fe and Mn and non-transition metal elements;
in formula (III), $-0.1 \leq x3 \leq 0.2$, $0 < e \leq 2$, $0 \leq d < 1$, $M^3$ is at least one of Ni, Fe, Cr, Ti, Zn, V, Al, Mg, Zr, and Ce, and $A^3$ is at least one of S, N, F, Cl, Br, and I;
in formula (IV), $M^4$ is a transition metal element, $M^{4'}$ is a transition metal element, $0 < x4 \leq 2$, $0.8 \leq y4 < 1$, and $0 < z \leq 20$;
in formula (V), $M^5$ and $M^{5'}$ are each independently selected from at least one of Ti, V, Cr, Mn, Fe, Co, Ni, Cu, Zn, Ga, Sr, Y, Nb, Mo, Sn, Ba, and W, $0 < x5 < 1$, $0 < y5 < 1$, $x5+y5=1$, and $A^5$ is selected from at least one of F, Cl and Br;
in formula (VI), $M^6$ is a metal cation different from Ni, Fe and Mn, $0.67 < x6 < 1.1$, $0 < y6 < 0.25$, $0 < z6 < 0.3$, $0 < y6+z6 < 0.55$, $0.45 < d6+e6 < 1$, $y6+z6+d6+e6=1$, $0 \leq \delta \leq 0.1$, and $M^6$ is selected from at least one of $Li^+$, $Cu^{2+}$, $Zn^{2+}$, $Co^{2+}$, and $Ti^{4+}$; and
the positive electrode active substance of the second cell comprises at least one of $LiFePO_4$, $LiMnPO_4$, $LiMn_{0.4}Fe_{0.6}PO_4$, $LiV_{0.3}Fe_{0.7}PO_4$, $LiMn_2O_4$, and $LiMn_{1.9}Al_{0.1}O_4$.

11. The battery module according to claim 10, wherein assuming that a total weight of the positive electrode active substance of the second cell accounts for 100%, a weight percentage of the at least one of lithium containing phosphate represented by formula (II), lithium manganese-based oxide represented by formula (III), compound represented by formula (IV), compound represented by formula (V), and compound represented by formula (VI) is not less than 30%.

12. The battery module according to claim 1, wherein in the battery module, the first cells are arranged closer to an outer side of the battery module.

13. The battery module according to claim 1, wherein a thermal conductivity coefficient of a housing of the first cell is denoted as k1, a thermal conductivity coefficient of a housing of the second cell is denoted as k2, and $0.8 \leq k1/k2 \leq 1.2$ holds true;
the thermal conductivity coefficient k1 of the housing of the first cell satisfies $20\ W/(m \cdot K) \leq k1 \leq 270\ W/(m \cdot K)$, and the thermal conductivity coefficient k2 of the second cell is $20\ W/(m \cdot K) \leq k2 \leq 250\ W/(m \cdot K)$; and
k1 satisfies $30\ W/(m \cdot K) \leq k1 \leq 250\ W/(m \cdot K)$, and the thermal conductivity coefficient k2 of the second cell satisfies $30\ W/(m \cdot K) \leq k2 \leq 250\ W/(m \cdot K)$.

14. The battery module according to claim 1, wherein an area of a largest thermal conductive surface between a first cell and a second cell that are adjacent to each other accounts for 60% to 100%; and/or an area of a largest thermal conductive surface between a first cell and a second cell that are adjacent to each other accounts for 60% to 100%.

15. A battery pack, comprising the battery module according to claim 1.

16. An electric apparatus, comprising at least one of the battery module according to claim 1.

* * * * *